US009067601B2

(12) United States Patent
Itabashi et al.

(10) Patent No.: US 9,067,601 B2
(45) Date of Patent: Jun. 30, 2015

(54) SPRUNG MASS DAMPING CONTROL SYSTEM OF VEHICLE

(75) Inventors: Kaiji Itabashi, Susono (JP); Gohki Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/126,937

(22) PCT Filed: Oct. 6, 2009

(86) PCT No.: PCT/IB2009/007049
§ 371 (c)(1),
(2), (4) Date: Apr. 29, 2011

(87) PCT Pub. No.: WO2010/049769
PCT Pub. Date: May 6, 2010

(65) Prior Publication Data
US 2011/0213527 A1  Sep. 1, 2011

(30) Foreign Application Priority Data

Oct. 31, 2008  (JP) .................................. 2008-282514
Feb. 18, 2009  (JP) .................................. 2009-035557

(51) Int. Cl.
*B60W 30/02* (2012.01)
*B60W 10/06* (2006.01)
(Continued)

(52) U.S. Cl.
CPC ............. *B60W 30/025* (2013.01); *B60W 10/06* (2013.01); *B60W 10/11* (2013.01); *B60W 10/184* (2013.01);
(Continued)

(58) Field of Classification Search
CPC ... B60W 30/025; B60W 30/20; B60W 10/06; B60W 10/11; B60W 10/184; B60W 2520/10; B60W 2520/16; B60W 2520/28; B60W 2540/10; B60W 2540/12; B60W 2710/105; B60W 2720/16; F02D 2200/0404
USPC .............................. 701/38, 42, 48, 61, 69, 37
See application file for complete search history.

(56) References Cited

U.S. PATENT DOCUMENTS 3,638,770 A * 2/1972 Frill et al. ........................ 477/28
4,871,039 A   10/1989 Daido et al.
(Continued)

FOREIGN PATENT DOCUMENTS

DE  10 2008 011 5    9/2008
EP   0 743 215       11/1996
(Continued)

OTHER PUBLICATIONS
International Search Report Issued Feb. 24, 2010 in PCT/IB09/007049 filed Oct. 6, 2009.
(Continued)

*Primary Examiner* — Mussa A Shaawat
*Assistant Examiner* — James E Stroud
(74) *Attorney, Agent, or Firm* — Oblon, McClelland, Maier & Neustadt, L.L.P.

(57) ABSTRACT

A sprung mass damping control system of a vehicle is provided. The sprung mass damping control system includes a sprung mass damping controller that sets a sprung mass damping control amount for damping sprung mass vibrations that occur in a vehicle body in response to an input from a road or a driver-requested torque, and a drive controller that controls an output of a vehicle drive unit so as to achieve the sprung mass damping control amount, thereby to execute sprung mass damping control. The drive controller is configured to permit or inhibit execution of the sprung mass damping control according to at least one of operating conditions of the vehicle, status conditions of the vehicle and driver's requests.

20 Claims, 9 Drawing Sheets

(51) Int. Cl.
  *B60W 10/11* (2012.01)
  *B60W 10/184* (2012.01)
  *B60W 30/20* (2006.01)

(52) U.S. Cl.
  CPC ............ *B60W 30/20* (2013.01); *B60W 2520/10* (2013.01); *B60W 2520/16* (2013.01); *B60W 2520/28* (2013.01); *B60W 2540/10* (2013.01); *B60W 2540/12* (2013.01); *B60W 2710/105* (2013.01); *B60W 2720/16* (2013.01); *F02D 2200/0404* (2013.01)

(56) References Cited

U.S. PATENT DOCUMENTS

| | | | |
|---|---|---|---|
| 5,137,105 | A | 8/1992 | Suzuki et al. |
| 5,183,127 | A | 2/1993 | Kageyama et al. |
| 5,275,474 | A | 1/1994 | Chin et al. |
| 5,406,486 | A | 4/1995 | Kamio et al. |
| 5,570,935 | A | 11/1996 | Monzaki |
| 5,711,024 | A | 1/1998 | Wanke |
| 5,748,474 | A | 5/1998 | Masuda et al. |
| 5,852,787 | A | 12/1998 | Fodor et al. |
| 5,868,474 | A | 2/1999 | Abe et al. |
| 5,987,367 | A | 11/1999 | Ohsaku et al. |
| 6,339,739 | B1 * | 1/2002 | Folke et al. ............ 701/70 |
| 6,441,573 | B1 * | 8/2002 | Zuber et al. ............ 318/375 |
| 6,498,975 | B1 | 12/2002 | Lee et al. |
| 6,654,675 | B2 | 11/2003 | Pedersen et al. |
| 6,837,217 | B1 * | 1/2005 | Hoshino et al. ............ 123/399 |
| 7,914,085 | B2 * | 3/2011 | Tsunehara ............ 303/155 |
| 8,340,864 | B2 * | 12/2012 | Itabashi et al. ............ 701/37 |
| 2001/0050072 | A1 | 12/2001 | Yomogida |
| 2002/0055415 | A1 | 5/2002 | Yoshikawa et al. |
| 2005/0049761 | A1 | 3/2005 | Kataoka et al. |
| 2005/0225170 | A1 * | 10/2005 | Tsunehara ............ 303/155 |
| 2006/0025906 | A1 | 2/2006 | Syed et al. |
| 2006/0052908 | A1 | 3/2006 | Matsumoto et al. |
| 2008/0091323 | A1 | 4/2008 | Kuwahara et al. |
| 2008/0189021 | A1 | 8/2008 | Inoue et al. |
| 2010/0228465 | A1 | 9/2010 | Itabashi |
| 2010/0241305 | A1 | 9/2010 | Itabashi et al. |
| 2011/0022286 | A1 | 1/2011 | Sato |
| 2011/0137514 | A1 | 6/2011 | Itabashi |
| 2011/0266760 | A1 | 11/2011 | Itabashi |
| 2012/0053790 | A1 | 3/2012 | Oikawa |
| 2012/0059544 | A1 | 3/2012 | Kinoshita et al. |
| 2012/0065826 | A1 | 3/2012 | Kinoshita et al. |

FOREIGN PATENT DOCUMENTS

| | | |
|---|---|---|
| EP | 1 342 610 | 9/2003 |
| EP | 1 574 386 A1 | 9/2005 |
| EP | 1 606 135 B1 | 12/2005 |
| EP | 1 632 382 | 3/2006 |
| JP | 64-12961 A | 1/1989 |
| JP | 1-271617 A | 10/1989 |
| JP | 3-114912 A | 5/1991 |
| JP | 4-166632 A | 6/1992 |
| JP | 5-85342 A | 4/1993 |
| JP | 6-122332 A | 5/1994 |
| JP | 7-333239 A | 12/1995 |
| JP | 11-37872 A | 2/1999 |
| JP | 2001-349243 A | 12/2001 |
| JP | 2002-89326 A | 3/2002 |
| JP | 2004 168148 | 6/2004 |
| JP | 2005-69897 A | 3/2005 |
| JP | 2006-69472 A | 3/2006 |
| JP | 2006-177166 A | 7/2006 |
| JP | 2006-521241 A | 9/2006 |
| JP | 2006-281925 A | 10/2006 |
| JP | 2008-105471 A | 5/2008 |
| JP | 2008 105494 | 5/2008 |
| JP | 2009-113517 A | 5/2009 |
| WO | WO 2004/085190 A1 | 10/2004 |
| WO | WO 2006/134438 | 12/2006 |
| WO | 2008 050782 | 5/2008 |

OTHER PUBLICATIONS

Communication pursuant to Article 94(3) EPC issued May 20, 2014 in European Patent Application No. 09 740 747.2

Notice of Allowance mailed Oct. 5, 2012 in co-pending U.S. Appl. No. 12/445,133.

Notice of Allowance mailed Jul. 12, 2012 in co-pending U.S. Appl. No. 12/445,133.

Office Action mailed Feb. 9, 2012 in co-pending U.S. Appl. No. 12/445,133.

Office Action mailed Oct. 5, 2011 in co-pending U.S. Appl. No. 12/445,133.

Japanese Office Action issued Jan. 10, 2012 in Patent Application No. 2010-091248 (Partial English Translation only).

International Search Report and Written Opinion issued Feb. 12, 2008 in PCT/JP2007/070681.

* cited by examiner

SPRUNG MASS DAMPING CONTROL SYSTEM OF VEHICLE

INCORPORATION BY REFERENCE

The disclosure of Japanese Patent Applications No. 2008-282514, filed on Oct. 31, 2008, and No. 2009-035557, filed on Feb. 18, 2009, including their specifications, drawings and abstracts, are incorporated herein by reference in their entirety.

BACKGROUND OF THE INVENTION

1. Field of the Invention

The invention relates to a sprung mass damping control system of a vehicle for damping sprung mass vibrations that occur in the vehicle body.

2. Description of the Related Art

There is known a technology, called sprung mass damping control, for damping or suppressing sprung mass vibrations that occur in the vehicle body by utilizing suitable vibration damping means. For example, a technology of controlling the driving force of the vehicle in order to damp sprung mass vibrations of the vehicle is described in Japanese Patent Application Publication No. 2006-69472 (JP-A-2006-69472). According to JP-A-2006-69472, the driving force is controlled by increasing or reducing engine torque.

In the meantime, the sprung mass damping control is not necessarily executed in accordance with occurrence of sprung mass vibrations whenever sprung mass vibrations occur in the vehicle body. For example, the driver may not wish to have the sprung mass damping control executed because the driver feels uncomfortable, for example, or the behavior of the vehicle may be stabilized under another control (using, for example, a vehicle behavior stabilizing system or so-called VSC) without requiring execution of the sprung mass damping control. In this case, it is desirable to respect the driver's intention. Also, the sprung mass damping control may not be correctly carried out, depending on status conditions or running conditions of the vehicle.

SUMMARY OF THE INVENTION

The present invention provides a sprung mass damping control system that executes sprung mass damping control under appropriate conditions, to solve the above-described problems encountered in the conventional example.

According to one aspect of the invention, there is provided a sprung mass damping control system of a vehicle, including a sprung mass damping controller that sets a sprung mass damping control amount for damping sprung mass vibrations that occur in a vehicle body in response to an input from a road or a driver-requested torque, and a drive controller that controls an output of a vehicle drive unit so as to achieve the sprung mass damping control amount, thereby to execute sprung mass damping control. In the sprung mass damping control system, execution of the sprung mass damping control is permitted or inhibited according to at least one of operating conditions of the vehicle, status conditions of the vehicle and driver's requests.

In the sprung mass damping control system as described above, a sprung mass damping control starting pattern setting unit may be further provided which sets a control pattern at the time of start of the spring mass damping control to one of a sprung mass damping control starting pattern for immediately achieving the sprung mass damping control amount, and a sprung mass damping control starting pattern for gradually approaching the sprung mass damping control amount, according to at least one of the operating conditions of the vehicle, status conditions of the vehicle and the driver's requests, when execution of the sprung mass damping control is permitted while the sprung mass damping control is not executed. The drive controller is preferably configured to control the output of the vehicle drive unit, based on a set result of the sprung mass damping control starting pattern setting unit.

In the sprung mass damping control system as described above, a sprung mass damping control finishing pattern setting unit may be further provided which sets a control pattern at the time of completion of the spring mass damping control to one of a sprung mass damping control finishing pattern for immediately finishing the sprung mass damping control, and a sprung mass damping control finishing pattern for gradually finishing the sprung mass damping control, according to at least one of the operating conditions of the vehicle, status conditions of the vehicle and the driver's requests, when execution of the sprung mass damping control is inhibited while the sprung mass damping control is being executed. The drive controller is preferably configured to control the output of the vehicle drive unit, based on a set result of the sprung mass damping control finishing pattern setting unit.

According to another aspect of the invention, there is provided a sprung mass damping control system of a vehicle, including a sprung mass damping controller that sets a sprung mass damping control amount for damping sprung mass vibrations that occur in a vehicle body in response to an input from a road or a driver-requested torque, and a drive controller that controls an output of a vehicle drive unit so as to achieve the sprung mass damping control amount, wherein the sprung mass damping control is started or finished according to at least one of operating conditions of the vehicle, status conditions of the vehicle and driver's requests.

The above-indicated operating conditions of the vehicle preferably include a vehicle speed, a gear position of a transmission installed on the vehicle, an operating condition of a throttle valve, and rotating conditions of driving wheels. The above-indicated status conditions of the vehicle preferably include a temperature of a motor that drives a throttle valve of the vehicle, conditions of devices or components related to the sprung mass damping control, and a condition of an electronic control unit provided for implementing the sprung mass damping control. Also, the driver's requests preferably include a condition of a brake pedal operated by the driver, and a driver's request for execution of the sprung mass damping control.

In the sprung mass damping control system as described above, it is preferable that the sprung mass damping controller inhibits execution of the sprung mass damping control or reduce the spring mass damping control amount when upper speed limiting control for limiting the speed of the vehicle to a set upper-limit speed is executed. In this case, the sprung mass damping controller may inhibit execution of the sprung mass damping control when the speed of the vehicle is equal to or higher than a specified speed. Also, the sprung mass damping controller may reduce the sprung mass damping control amount as the vehicle speed increases, when the speed of the vehicle is equal to or higher than the specified speed.

The above-mentioned sprung mass vibrations may include at least one of vibrations applied in a direction of bouncing of the vehicle and vibrations applied in a direction of pitching of the vehicle.

According to the sprung mass damping control system of the vehicle as described above, the sprung mass damping control can be appropriately permitted to be executed or inhibited under various conditions. Furthermore, the sprung mass damping control system of the vehicle can start the sprung mass damping control according to an appropriate sprung mass damping control starting pattern that is determined depending on various conditions, and can finish the sprung mass damping control that is being executed, according to an appropriate sprung mass damping control finishing pattern that is determined depending on various conditions.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Some embodiments of sprung mass damping control systems of the invention will be described in detail with reference to the drawings. It is to be understood that the invention is not limited to these embodiments.

A sprung mass damping control system of a vehicle according to a first embodiment of the invention will be described with reference to FIG. 1 to FIG. 5.

Figure 1:
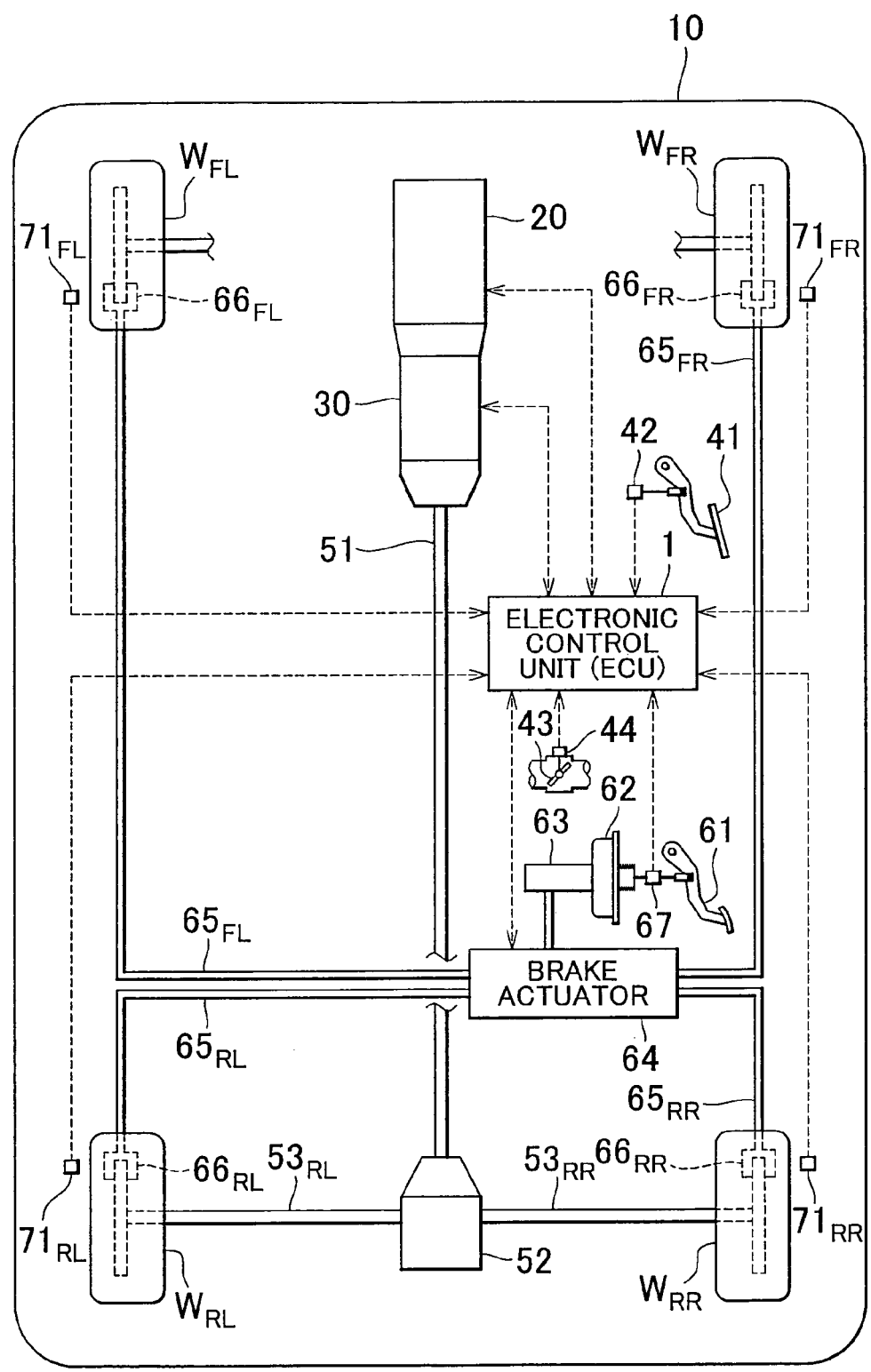
FIG. 1 is a view showing a vehicle in which a sprung mass damping control system according to one embodiment of the invention is used.

The sprung mass damping control system of the first embodiment is prepared as one function of an electronic control unit (ECU) 1 as shown in FIG. 1. The electronic control unit 1 consists principally of CPU (Central Processing Unit), ROM (Read-Only Memory) in which certain control programs, and the like, are stored in advance, RAM (Random Access Memory) that temporarily stores the results of computations of the CPU, back-up RAM that stores information prepared in advance, etc., which are not illustrated in FIG. 1.

FIG. 1 illustrates an example of vehicle 10 in which the sprung mass damping control system of this embodiment is used. The vehicle 10 illustrated in FIG. 1 is, for example, a FR (front-engine rear-drive) vehicle that transmits power output (output torque) from a power source at the front side of the vehicle to driving wheels $W_{RR}$, $W_{RL}$ at the rear side of the vehicle, via a power transmitting device, such as a transmission. It is, however, to be understood that the sprung mass damping control system of the first embodiment may also be used in other types of vehicles, such as a FF (front-engine front-drive) vehicle and a four-wheel drive vehicle, as well as the FR vehicle. The system of this embodiment may also be used in a vehicle having a mid-shipped engine or a rear engine. In addition, the system may also be used in a so-called hybrid vehicle having at least an engine and a motor as its power sources.

An engine 20 serving as a power source is installed as a power source on the vehicle 10. In the example shown in FIG. 1, the engine 20 is an internal combustion engine which operates as a heat engine in which fuel is burned in combustion chambers to generate thermal energy, which is then converted into mechanical energy, and also operates as a reciprocating engine that delivers mechanical power from an output shaft (crankshaft) utilizing reciprocating motions of pistons (not shown). More specifically, the engine 20 may be in the form of a gasoline engine using gasoline as a fuel, or a diesel engine using light oil as a fuel, for example.

The engine 20 is provided with a fuel injection system (not shown). The operation of the fuel injection system is controlled by an engine controller of the electronic control unit 1. Where the engine 20 is a diesel engine, for example, the engine controller controls the output of the engine 20 by controlling the amount of fuel injected, and causes wheel torque (wheel driving force) corresponding to the engine output to be applied to the driving wheels $W_{RR}$, $W_{RL}$ if there is no change in the gear position of the transmission 30. Namely, the engine 20 functions as a vehicle drive unit that adjusts the magnitude of the wheel torque (wheel driving force), and is able to produce output (driving torque, driving force) for achieving a target wheel torque (target wheel driving force). The fuel injection amount (in other words, the target wheel torque, or target wheel driving force, or target vehicle driving torque, or target vehicle driving force) is determined in accordance with the amount of operation of an accelerator pedal 41 by the driver, or a required value if an automatic driving mode, or the like, is established. The amount of operation of the accelerator pedal 41 is, for example, a pedal pressure applied to the accelerator pedal 41 or the amount by which the accelerator pedal 41 is depressed (i.e., a travel of the pedal 41), and is detected or estimated by an accelerator pedal operation amount acquiring unit 42.

The output (driving torque, driving force) of the engine 20 is fed to the transmission 30 where the speed of rotation is changed according to the currently established gear position or gear (speed) ratio, and is then delivered to a propeller shaft 51. The transmission 30 may be a manual transmission, or an automatic transmission having two or more gear positions, or a continuously variable automatic transmission, for example. In the example of FIG. 1, the transmission 30 is an automatic transmission having two or more gear positions. The transmission 30 is provided with a hydraulic control device (not shown), and the operation of the hydraulic control device is controlled by a shift controller of the electronic control unit 1. The shift controller controls the hydraulic control device so as to place the transmission 30 in a target gear position set based on the required wheel driving force, vehicle speed, and so forth. The magnitude of the output of the transmission 30 varies in accordance with the gear position (gear ratio). Namely, the transmission 30, when shifted from one gear position to another, changes the magnitude of the output to the propeller shaft 51, so that the magnitude of the wheel torque (wheel driving force) of the driving wheels $W_{RR}$, $W_{RL}$ can be adjusted or controlled. Thus, the transmission 30 functions as a vehicle drive unit that changes its output (driving torque, driving force) in accordance with the gear position or gear ratio so as to adjust the magnitude of the wheel torque (wheel driving force).

The torque of the propeller shaft 51 is fed to a differential gear 52 and distributed to right and left driveshafts $53_{RR}$, $53_{RL}$, and is then transmitted as wheel torque (wheel driving force) to the driving wheels $W_{RR}$, $W_{RL}$ coupled to the driveshafts $53_{RR}$, $53_{RL}$, respectively.

The vehicle 10 runs forward or backward by exerting the wheel torque (wheel driving force) on the respective driving wheels $W_{RR}$, $W_{RL}$. The vehicle 10 is provided with a brake system that stops the vehicle 10 or reduces the speed of the vehicle 10 while it is running. The brake system is arranged to produce target wheel braking torques (target wheel braking forces) whose magnitudes are individually set for the respective wheels $W_{FR}$, $W_{FL}$, $W_{RR}$, $W_{RL}$. In the example of FIG. 1, a brake fluid pressure is utilized to produce friction between engaging elements, so that the target wheel braking torque (target wheel braking force) acts on each of the wheels $W_{FR}$, $W_{FL}$, $W_{RR}$, $W_{RL}$.

The brake system includes a brake pedal 61 adapted to be operated by the driver, a brake booster 62 for boosting a pedal pressure applied to the brake pedal 61, a master cylinder 63 for converting the pedal pressure boosted by the brake booster 62 into a brake fluid pressure, an oil pressure regulator (which will be called "brake actuator") 64 capable of regulating the brake fluid pressure into pressures to be applied to the respective wheels $W_{FR}$, $W_{FL}$, $W_{RR}$, $W_{RL}$, brake fluid pressure lines $65_{FR}$, $65_{FL}$, $65_{RR}$, $65_{RL}$ through which the brake fluid pressures that have passed the brake actuator 64 are delivered to the respective wheels $W_{FR}$, $W_{FL}$, $W_{RR}$, $W_{RL}$, and braking force producing devices $66_{FR}$, $66_{FL}$, $66_{RR}$, $66_{RL}$ to which the brake fluid pressures are supplied via the brake fluid pressure lines $65_{FR}$, $65_{FL}$, $65_{RR}$, $65_{RL}$ so that the wheel braking torques (wheel braking forces) are exerted on the respective wheels $W_{FR}$, $W_{FL}$, $W_{RR}$, $W_{RL}$.

Each of the braking force producing device $66_{FR}$, $66_{FL}$, $66_{RR}$, $66_{RL}$ is a friction brake device that performs a braking action by applying frictional force to a member that rotates as a unit with the corresponding wheel $W_{FR}$, $W_{FL}$, $W_{RR}$, $W_{RL}$, thereby to retard rotation of the wheel $W_{FR}$, $W_{FL}$, $W_{RR}$, $W_{RL}$. For example, each of the braking force producing devices $66_{FR}$, $66_{FL}$, $66_{RR}$, $66_{RL}$ includes a disc rotor (not shown) mounted integrally on the corresponding wheel $W_{FR}$, $W_{FL}$, $W_{RR}$, $W_{RL}$, a brake pad (not shown) as a friction material that is pressed against the disc rotor so as to produce frictional force, and a caliper (not shown) that is fixed to the vehicle body and is operable to push the brake pad toward the disc rotor under the brake fluid pressure supplied from the brake actuator 64. In the braking force producing device $66_{FR}$, $66_{FL}$, $66_{RR}$, $66_{RL}$, the brake pad is pressed against the disc rotor with pressing force corresponding to the master cylinder pressure or regulated brake fluid pressure fed from the brake actuator 64. Accordingly, the wheel braking torque (wheel braking force) whose magnitude is commensurate with the master cylinder pressure or regulated brake fluid pressure acts on each of the wheels $W_{FR}$, $W_{FL}$, $W_{RR}$, $W_{RL}$. In the following description, the braking torque and braking force produced by the master cylinder pressure will be called "master cylinder pressure braking torque" and "master cylinder pressure braking force", respectively. Also, the braking torque and braking force produced by the regulated brake fluid pressure obtained by increasing the master cylinder pressure will be called "increased-pressure braking torque" and "increased-pressure braking force", respectively.

The brake actuator 64 consists principally of an oil reservoir (not shown), an oil pump (not shown), and pressure increasing/reducing control valves (not shown) for increasing or reducing the master cylinder pressure to provide brake fluid pressures for the respective brake fluid pressure lines $65_{FR}$, $65_{FL}$, $65_{RR}$, $65_{RL}$. The oil pump, pressure increasing/reducing control valves and other components of the brake actuator 64 are controlled by a brake controller of the electronic control unit 1. The brake controller sets a target wheel braking torque or target wheel braking force, or a target vehicle braking torque or target vehicle braking force, for each of the wheels $W_{FR}$, $W_{FL}$, $W_{RR}$, $W_{RL}$, based on the amount of operation of the brake pedal 61 by the driver, or a required value if the automatic driving mode is established, for example. The amount of operation of the brake pedal 61 is a pedal pressure applied to the brake pedal 61 or the amount of depression (or a travel) of the brake pedal 61, and is detected or estimated by a brake pedal operation amount acquiring unit 67. If the master cylinder pressure braking torque (master cylinder pressure braking force) is smaller than the target wheel braking toque (target wheel braking force), the brake controller determines a target brake fluid pressure to be applied to each braking force producing device $66_{FR}$, $66_{FL}$, $66_{RR}$, $66_{RL}$, which can make up for the shortage of the braking torque (pressure), and controls the brake actuator 64 based on the target brake fluid pressure so as to increase the master cylinder pressure. With this control, the increased-pressure braking torque (increased-pressure braking force) that satisfies the target wheel braking torque (braking wheel braking force) is applied to the braking force producing device $66_{FR}$, $66_{FL}$, $66_{RR}$, $66_{RL}$.

Furthermore, the vehicle 10 is provided with wheel speed acquiring devices $71_{FR}$, $71_{FL}$, $71_{RR}$, $71_{RL}$ for acquiring the wheel speeds of the respective wheels $W_{FR}$, $W_{FL}$, $W_{RR}$, $W_{RL}$. For example, a wheel speed sensor that detects the wheel speed may be used as the vehicle speed acquiring device $71_{FR}$, $71_{FL}$, $71_{RR}$, $71_{RL}$.

Figure 2:
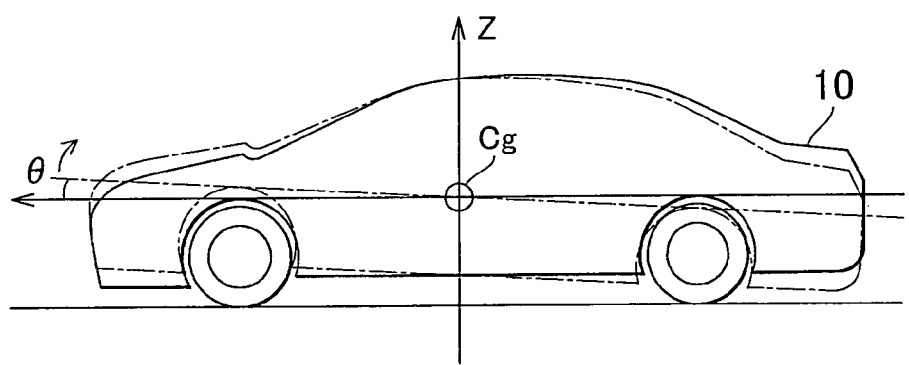
FIG. 2 is a view useful for explaining state variables of sprung mass vibrations in the sprung mass damping control system according to the embodiment of the invention.

In the meantime, when external force or torque (i.e. disturbance) caused by uneven spots on the road, for example, is applied to the wheels $W_{FR}$, $W_{FL}$, $W_{RR}$, $W_{RL}$ of the vehicle 10 during running, the external force, or the like, is transmitted to the vehicle body via the wheels $W_{FR}$, $W_{FL}$, $W_{RR}$, $W_{RL}$ and a suspension (not shown). Due to the input (e.g., the external force) from the road during running, which is transmitted to the vehicle body via the wheels $W_{FR}$, $W_{FL}$, $W_{RR}$, $W_{RL}$ and the suspension, vibrations of 1 to 4 Hz, more precisely, vibrations of about 1.5 Hz (which will be called "sprung mass vibrations") may occur in the vehicle body of the vehicle 10. The sprung mass vibrations include a component (which will be called "bouncing vibrations") appearing in the vertical direction (Z direction) of the vehicle 10 (strictly speaking, along a vertical line passing the center of gravity Cg of the vehicle), and a component (which will be called "pitching vibrations") appearing in the pitching direction (θ direction) about the center of gravity Cg of the vehicle. When the sprung mass vibrations occur, at least one of the bouncing vibrations and the pitching vibrations occurs. FIG. 2 illustrates a posture taken by the vehicle 10 when the nose (i.e., the front portion of the vehicle 10) is lifted. Also, when the vehicle drive unit (i.e., the engine 20 or the transmission 30) operates according to a driver's drive request, or the like, and variations occur in the wheel torque (wheel driving force) of the driving wheels $W_{RR}$, $W_{RL}$, similar sprung mass vibrations (at least one of the bouncing vibrations and the pitching vibrations) may occur in the vehicle 10.

The vehicle 10 of the first embodiment is provided with the above-mentioned sprung mass damping control system prepared as a function of the electronic control unit 1 so as to damp the sprung mass vibrations as described above. The sprung mass damping control refers to control for damping the sprung mass vibrations. The sprung mass damping control system controls the wheel torque (wheel driving force) of the driving wheels $W_{RR}$, $W_{RL}$, using at least one of the above-mentioned vehicle drive units (the engine 20 and the transmission 30), thereby to damp the sprung mass vibrations that occur in the vehicle body.

In the first embodiment, a dynamic model of sprung mass vibrations (bounding vibrations and pitching vibrations) of the vehicle body is constructed, and state variables of the sprung mass vibrations are calculated based on the dynamic model. The state variables of the sprung mass vibrations refer to displacements z, θ of the vehicle body and the rates of change thereof dz/dt, dθ/dt when driver-requested torque corresponding to a driver's drive request (more specifically, wheel torque of the driving wheels $W_{RR}$, $W_{RL}$ into which the driver-requested torque is converted) and the current wheel torque (more specifically, an estimated value of the wheel torque) are put into the dynamic model. Then, in the first embodiment, the driver-requested torque is corrected so that the state variables converge to 0, so as to adjust the output (driving torque, driving force) of the vehicle drive unit, and thus damp the sprung mass vibrations.

Figure 3:
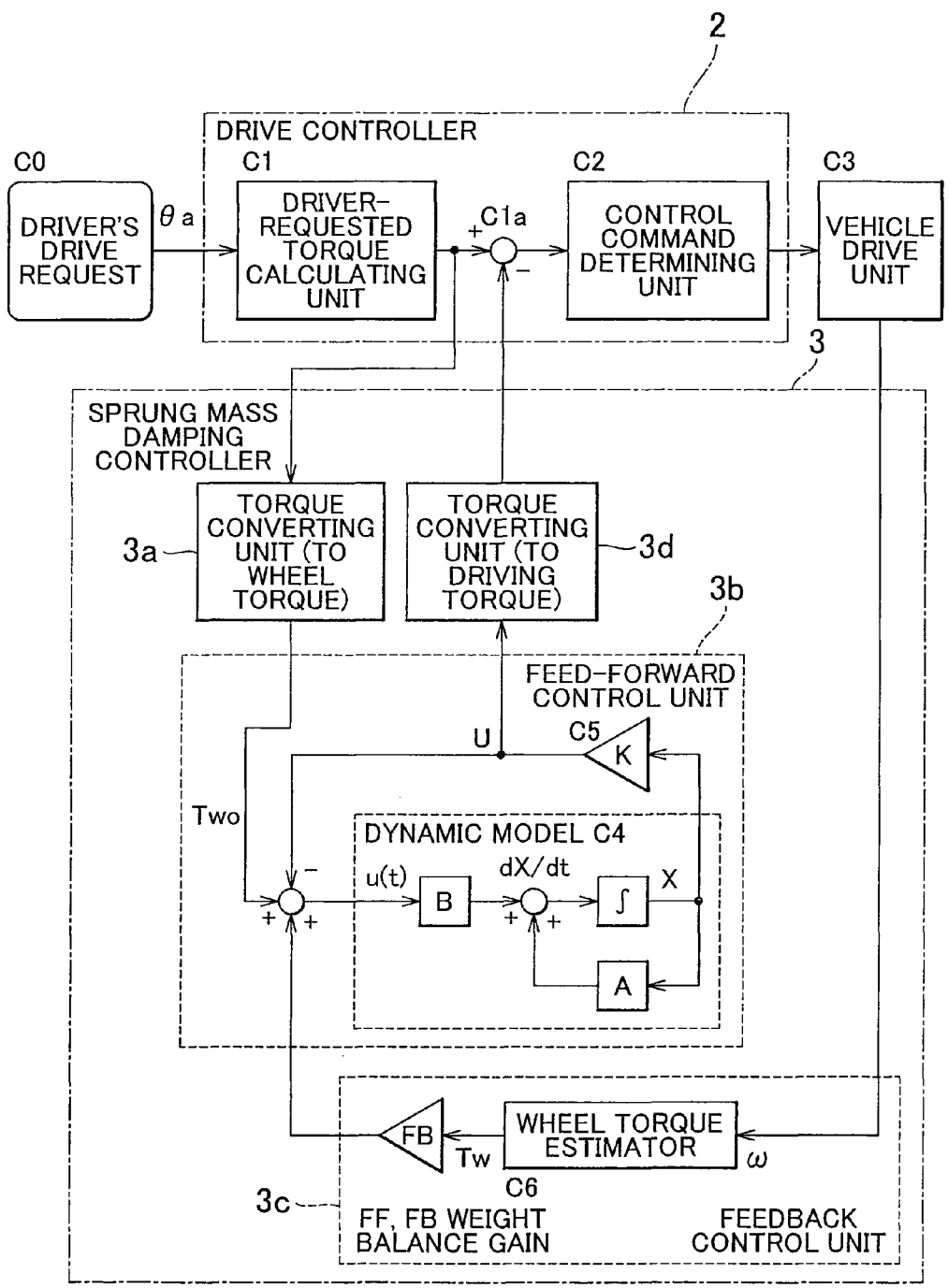
FIG. 3 is a schematic diagram in the form of a control block diagram, showing one example of the configuration of a sprung mass damping control system according to a first embodiment of the invention.

FIG. 3 is a control block diagram schematically illustrating the configuration of the sprung mass damping control system. The sprung mass damping control system includes a drive controller 2 for supplying a driver's drive request to the vehicle 10, and a sprung mass damping controller 3 that sets a sprung mass damping control amount for damping the sprung mass vibrations (bouncing vibrations and pitching vibrations) of the vehicle body.

The sprung mass damping control amount refers to an amount of correction of the driver-requested wheel torque Tw0, which is obtained at C5 in the sprung mass damping controller 3, as will be described later. In the sprung mass damping control, the correction amount of the driver-requested wheel torque Tw0 is applied to the driving wheels $W_{RR}$, $W_{RL}$, so that the sprung mass vibrations are damped or suppressed. Thus, in the sprung mass damping control, the correction amount of the driver-requested wheel torque Tw0 is converted into the unit of driving torque of the vehicle drive unit (C3) at a converting unit 3d for converting wheel torque into driving torque (which will be described later), and the output (driving torque, driving force) of the vehicle drive unit (C3) is controlled by the drive controller 2 that receives the correction amount of the driving torque.

The drive controller 2 performs output control (driving torque control, driving force control) on the vehicle drive unit (C3) installed on the vehicle 10. The drive controller 2 corresponds to at least one of the above-mentioned engine controller and shift controller. The drive controller 2 is roughly divided into a driver-requested torque calculating unit (C1) for obtaining driver-requested torque (in other words, drive-requested driving torque) of the vehicle drive unit (C3) corresponding to a drive request made by the driver, and a control command determining unit (C2) that determines a control command to the vehicle drive unit based on the driver-requested torque.

The drive controller 2 converts a drive request (C0) made by the driver, namely, the amount of operation (e.g., the amount of depression θa) of the accelerator pedal 41, into driver-requested torque for use in the vehicle drive unit (C3) at C1, and converts the driver-requested torque into a control command to the vehicle drive unit (C3) at C2, which command is then transmitted to the vehicle drive unit (C3). More specifically, where the vehicle drive unit (C3) to be controlled under the sprung mass damping control is the engine 20, the engine controller converts the driver's drive request (C0) into required output torque of the engine 20 at C1, and converts the required output torque into a control command to the engine 20 at C2, which command is transmitted to the engine 20. The control command to the engine 20 is, for example, a target throttle opening if the engine 20 is a gasoline engine, or a target fuel injection amount if the engine 20 is a diesel engine, or a target current amount if the vehicle drive unit is a motor. Where the vehicle drive unit (C3) to be controlled under the sprung mass damping control is the transmission 30, the shift controller converts the driver's drive request (C0) into required output torque of the transmission 30 at C1, and converts the required output torque into a control command to the transmission 30 at C2, which command is then transmitted to the transmission 30. The control command to the transmission 30 is a gear position or a gear ratio corresponding to the required output torque.

The sprung mass damping controller 3 includes a torque converting unit 3a for converting the driver-requested torque of the driver-requested torque calculating unit (C1) into driver-requested wheel torque Tw0 to be applied to the driving wheels $W_{RR}$, $W_{RL}$, a feed-forward control unit 3b, a feedback control unit 3c, and a torque converting unit 3b for converting the amount of correction of the driver-requested wheel torque Tw0 into the unit of driving torque of the vehicle drive unit (C3).

The feed-forward control unit 3b is configured as a so-called optimal regulator. In the feed-forward control unit 3b, the driver-requested wheel torque Tw0 obtained as a result of conversion by the torque converting unit 3a is put into a block of a dynamic model (C4) of the sprung mass vibrations of the vehicle body. In the dynamic model block (C4), responses of the state variables of the vehicle body to the input driver-requested wheel torque Tw0 are calculated, and the amount of correction of the driver-requested wheel torque Tw0, which would converge the state variables to the minimum, is calculated at C5.

The feedback control unit 3c is also configured as a so-called optimal regulator. In the feedback control unit 3c, an estimated value Tw of the wheel torque applied to the driving wheels $W_{RR}$, $W_{RL}$ is calculated by a wheel torque estimator (C6) in a manner as will be described later, and a FB gain (a gain for balancing contributions of the driver-requested wheel torque Tw0 and the wheel torque estimated value Tw in the dynamic model block (C4)) is put on the wheel torque estimated value Tw0. The wheel torque estimated value Tw on which the FB gain was put is added as a disturbance input to the driver-requested wheel torque Tw0, and the result of the addition is fed to the dynamic model block (C4). In this manner, the amount of correction of the driver-requested wheel torque Tw0 with respect to the disturbance is also calculated.

The correction amount of the driver-requested wheel torque Tw0 obtained at C5 is converted into the unit of driving torque of the vehicle drive unit (C3) in the torque converting unit 3d, and then transmitted to an adder (C1a) of the drive controller 2. In the drive controller 2, the driver-requested torque is corrected based on the correction amount so that no sprung mass vibrations occur, and the corrected torque is converted into a control command to the vehicle drive unit (C3) at C2, which command is transmitted to the vehicle drive unit (C3).

In the sprung mass damping control implemented by the sprung mass damping control system, a hypothetical dynamic model of sprung mass vibrations (bouncing vibrations and pitching vibrations) of the vehicle body is given, and equations of state for state variables in the bouncing direction and pitching directions are formulated, using the driver-requested wheel torque Tw0 and the wheel torque estimated value Tw (disturbance) as inputs to the model. In the sprung mass damping control, the input (torque value) that converges the state variables in the bouncing direction and pitching direction to 0 is determined from the equations of state, using the theory of the optimal regulator, and the control command to the vehicle drive unit (C3) in connection with the driver-requested torque is corrected based on the torque value.

Figure 4:
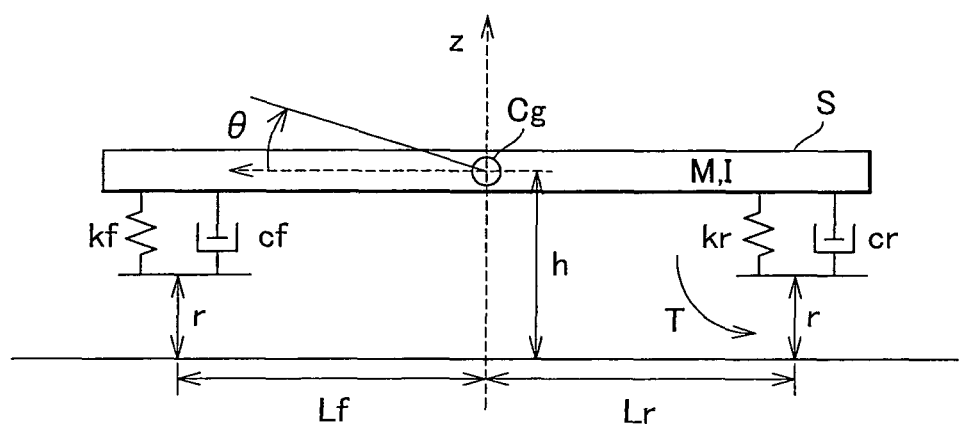
FIG. 4 is a view explaining one example of dynamic model of sprung mass vibrations constructed by the sprung mass damping control system according to the first embodiment of the invention.

An example of the dynamic model (sprung mass vibration model of the vehicle body) is illustrated in FIG. 4, in which the vehicle body is regarded as a rigid body S having a mass M and a moment of inertia I, and the rigid body S is supported by a front-wheel suspension having a modulus of elasticity kf and a damping factor cf and a rear-wheel suspension having a modulus of elasticity kr and a damping factor cr. In this case, an equation of motion in the bouncing direction at the center of gravity Cg of the vehicle and an equation of motion in the pitching direction at the center of gravity Cg may be expressed by the following equations (1a), (1b).

$$M \frac{d^2 z}{dt^2} = -kf(z + Lf \cdot \theta) - cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right) \quad (1a)$$

$$I \frac{d^2 \theta}{dt^2} = -Lf\left\{kf(z + Lf \cdot \theta) + cf\left(\frac{dz}{dt} + Lf \cdot \frac{d\theta}{dt}\right)\right\} + Lr\left\{kr(z - Lr \cdot \theta) + cr\left(\frac{dz}{dt} - Lr \cdot \frac{d\theta}{dt}\right)\right\} + \frac{h}{r} \cdot T \quad (1b)$$

In the above-indicated equations (1a), (1b), Lf, Lr denote the distance from the center of gravity Cg of the vehicle to the front-wheel axle and the distance from the center of gravity Cg to the rear-wheel axle, respectively, and r denotes the radius of the wheels. Also, h denotes the distance from the road surface to the center of gravity Cg of the vehicle. In the above equation (1a), the first term and second term represent a component of force applied from the front-wheel axle, and the third term and fourth term represent a component of force applied from the rear-wheel axle. In the above equation (1b), the first term represents a moment component of force from the front-wheel axle, and the second term represents a moment component of force from the rear-wheel axle. Also, the third term of the equation (1b) represents a moment component of force given by the wheel torque T (=Tw0+Tw) acting on the driving wheels $W_{RR}$, $W_{RL}$ to around the center of gravity Cg of the vehicle.

The above-indicated equations (1a), (1b) may be rewritten into the form of an equation of state (of a linear system) as expressed by the following equation (2a), where the displacements z, θ of the vehicle body and their rates of change dz/dt, dθ/dt are represented by a state variable vector X(t).

$$dX(t)/dt = A \times X(t) + B \times u(t) \quad (2a)$$

In the above equation (2a), X(t), A, B are expressed as follows.

$$X(t) = \begin{bmatrix} z \\ dz/dt \\ \theta \\ d\theta/dt \end{bmatrix}, \quad (2b)$$

$$A = \begin{bmatrix} 0 & 1 & 0 & 0 \\ a1 & a2 & a3 & a4 \\ 0 & 0 & 0 & 1 \\ b1 & b2 & b3 & b4 \end{bmatrix}, \quad (2c)$$

$$B = \begin{bmatrix} 0 \\ 0 \\ 0 \\ p1 \end{bmatrix} \quad (2d)$$

The elements a1 to a4 and b1 to b4 of the above-indicated matrix A are given below by grouping the coefficients of z, θ, dz/dt and dθ/dt together in the above-indicated equations (1a), (1b).

$$a1 = -(Kf + Kr)/M \quad (3a)$$

$$a2 = -(cf + cr)/M \quad (3b)$$

$$a3 = -(kf \times Lf - kr \times Lr)/M \quad (3c)$$

$$a4 = -(cf \times Lf - cr \times Lr)/M \quad (3d)$$

$$b1 = -(Lf \times kf - Lr \times kr)/I \quad (3e)$$

$$b2 = -(Lf \times cf - Lr \times cr)/I \quad (3f)$$

$$b3 = -(Lf^2 \times kf + Lr^2 \times Kr)/I \quad (3g)$$

$$b4 = -(Lf^2 \times cf + Lr^2 \times cr)/I \quad (3h)$$

Also, u(t) in the above equation (2a) is the input of the system expressed by the equation (2a), and is given as follows.

$$u(t) = T \quad (2e)$$

Accordingly, the element p1 of the matrix B is expressed as follows, according to the above-indicated equation (1b).

$$p1 = h/(I \times r) \quad (1c)$$

If u(t) is substituted by the following equation (2f) in the above equation (2a) (equation of state), the equation (2a) is rewritten into the following equation (2g).

$$u(t) = -K \times X(t) \quad (2f)$$

$$dX(t)/dt = (A - BK) \times X(t) \quad (2g)$$

Accordingly, if the initial values $X_0$ of X(t) are set such that $X_0(t) = (0, 0, 0, 0)$ (assuming that there are no vibrations before torque is applied), and gain K that converges X(t), i.e., the magnitudes of the displacements in the bouncing direction and pitching direction and the rates of change thereof, to 0 is determined when the differential equation (2g) of the state variable vector X(t) is solved, the torque value u(t) for damping sprung mass vibrations is determined.

The gain K may be determined using the theory of the optimal regulator. According to the theory, when the value of an evaluation function of the quadratic form (the range of the integral is from 0 to ∞):

$$J = \int (X^T Q X + u^T R u) dt \quad (4a)$$

is at the minimum, X(t) is stably converged to 0 in the equation of state (the above-indicated equation (2a)). The matrix K that minimizes the evaluation function J is given by:

$$K = R^{-1} \times B^T \times P \tag{4b}$$

Here, P is a solution to the Riccati equation as follows.

$$-dP/dt = A^T P + PA + Q - PBR^{-1}B^T P \tag{4c}$$

The Riccati equation can be solved by a certain method known in the field of the linear system, and the gain K is determined based on P.

Q and R in the evaluation function J and the Riccati equation (4c) are a positive semidefinite symmetric matrix and a positive definite symmetric matrix, respectively, which are set arbitrarily, and they are weight matrices of the evaluation function J which are determined by the designer of the system. In the case of the dynamic model of this example, Q and R are set as follows.

$$Q = \begin{bmatrix} 1 & 0 & 0 & 0 \\ 0 & 10^3 & 0 & 0 \\ 0 & 0 & 1 & 0 \\ 0 & 0 & 0 & 10^2 \end{bmatrix}, \tag{5a}$$

$$R = (1) \tag{5b}$$

If Q and R are set as indicated above, and the norms (sizes) of particular ones (e.g., dz/dt, dθ/dt) in the components of the state variable vector X(t) are set to be larger than the norms of the other components (e.g., z, θ) in the above-indicated equation (4a), the components of which the norms are set larger are more stably converged to 0. If the values of the components of Q are increased, emphasis is placed on the transition characteristics, namely, the values of the state variable vector X(t) quickly converge to stable values. If the value of R is increased, the energy consumed is reduced.

In the actual sprung mass damping control of the sprung mass damping system of the first embodiment, the state variable vector X(t) is calculated in the dynamic model block (C4) by solving the differential equation (2a) using the torque input value, as shown in FIG. 3. In the system as represented by the above-indicated equations (1a), (1b), value U(t), which is obtained at C5 by multiplying the state variable vector X(t) as the output of the motion model block (C4) by the gain K determined so that the state variable vector X(t) converges to 0 or the minimum value as described above, is converted into the unit of driving torque of the vehicle drive system (C3), and is subtracted from the driver-requested torque at the adder (C1a). This system is a resonance system, and the value of the state variable vector X(t) when the system receives a given input substantially consists solely of a component of the natural frequency of the system. Accordingly, by subtracting (converted) U(t) from a control command corresponding to the driver-requested torque, the driver-requested torque is corrected in terms of the component of the natural frequency of the system, namely, a component that causes sprung mass vibrations to occur in the vehicle body, and the sprung mass vibrations are damped or suppressed. If the component of the natural frequency of the system is eliminated from the torque requested by the driver, the component of the natural frequency of the system in a driver-requested torque command received by the vehicle drive unit (C3) is −U(t) only, and vibrations due to Tw (disturbance) are settled. While U(t) is looped to the input side of the motion model block (C4) in FIG. 3, this loop may be omitted or eliminated for reduction of the amount of computations provided that a desired sprung mass damping capability is provided. Also, while only the feedback control involves the FF, FB weight balance gain in FIG. 3, the feed-forward control may also involve the FF, FB weight balance gain.

Figure 5:
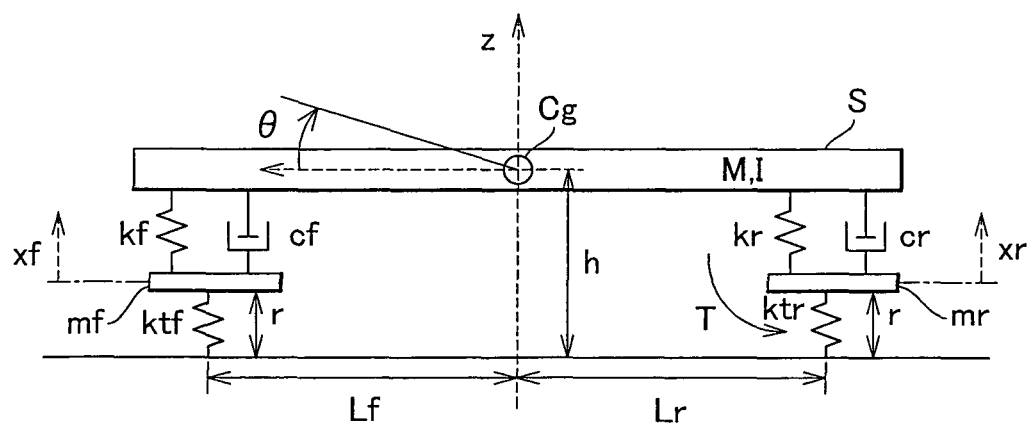
FIG. 5 is a view explaining another example of dynamic model of sprung mass vibrations constructed by the sprung mass damping control system according to the first embodiment of the invention.

As a dynamic model for the motion of the vehicle in the bouncing direction and pitching direction, a model (sprung and unsprung mass vibration model of the vehicle body) as shown in FIG. 5 by way of example may be employed, which takes account of the elastic properties of tires of the front and rear wheels, which are added to the above-described model of FIG. 4. If the tires of the front wheels and rear wheels have moduli of elasticity ktf, ktr, respectively, equations of motion in the bouncing direction with respect to the center of gravity of the vehicle body and equations of motion in the pitching direction about the center of gravity may be represented by the following equations (6a) to (6d).

$$M\frac{d^2 z}{dt^2} = -kf(z + Lf \cdot \theta - xf) - cf\left(\frac{dz}{dt} + Lf \cdot \frac{d\theta}{dt} - \frac{dxf}{dt}\right) - \tag{6a}$$
$$kf(z - Lr \cdot \theta - xr) - cr\left(\frac{dz}{dt} - Lr \cdot \frac{d\theta}{dt} - \frac{dxr}{dt}\right)$$

$$I\frac{d^2 \theta}{dt^2} = -Lf\left\{kf(z + Lf \cdot \theta - xf) + cf\left(\frac{dz}{dt} + Lf \cdot \frac{d\theta}{dt} - \frac{dxf}{dt}\right)\right\} + \tag{6b}$$
$$Lr\left\{kr(z - Lr \cdot \theta - xr) + cr\left(\frac{dz}{dt} - Lr \cdot \frac{d\theta}{dt} - \frac{dxr}{dt}\right)\right\} + \frac{h}{r} \cdot T$$

$$mf\frac{d^2 xf}{dt^2} = kf(z + Lf \cdot \theta - xf) + cf\left(\frac{dz}{dt} + Lf \cdot \frac{d\theta}{dt} - \frac{dxf}{dt}\right) + ktf \cdot xf \tag{6c}$$

$$mr\frac{d^2 xr}{dt^2} = kr(z - Lr \cdot \theta - xr) + cr\left(\frac{dz}{dt} - Lr \cdot \frac{d\theta}{dt} - \frac{dxr}{dt}\right) + ktr \cdot xr \tag{6d}$$

In each of the above-indicated equations (6a) to (6d), xf and xr are the displacements of the unsprung masses of the front wheels and rear wheels, respectively, and mf and mr are the unsprung masses of the front wheels and rear wheels, respectively. The equations (6a) to (6d) provide an equation of state like the above-indicated equation of state (2a), in the same manner as in the case of FIG. 4. In the equation of state representing the model of FIG. 5, z, θ, xf, xr and their time differential values are represented by a state variable vector, and matrix A has eight rows and eight columns while matrix B has eight rows and one column. The gain matrix K that converges the state variables of this vector to 0 can be determined according to the theory of the optimal regulator. In this case, the actual sprung mass damping control is also similar to that of the case of FIG. 4.

In the feedback control unit 3c of the sprung mass damping controller 3 of FIG. 3, the wheel torque as an input representing disturbance may be actually detected by a torque sensor provided on each of the vehicle wheels $W_{FR}$, $W_{FL}$, $W_{RR}$, $W_{RL}$, for example. In the example of FIG. 3, however, a wheel torque estimated value Tw that is estimated by the wheel torque estimator (C6) from other values that can be detected in the running vehicle 10 is used.

The wheel torque estimated value Tw may be estimated or calculated according to the following equation (7a), using a time differential value of the wheel rotational speed ω or wheel speed value r×ω obtained from the wheel speed acquiring devices $71_{RR}$, $71_{RL}$ (wheel speed sensors) of the driving wheels $W_{RR}$, $W_{RL}$, for example. In the equation (7a) below, M is the mass of the vehicle, and r is the radius of the wheel.

$$Tw = M \times r^2 \times d\omega/dt \tag{7a}$$

Assuming that the sum of driving forces exerted by the driving wheels $W_{RL}$, $W_{RR}$ at locations where the wheels are in contact with the road is equal to the overall driving force M×G (G is the acceleration) of the vehicle 10, the wheel torque estimated value Tw is given by the following equation (7b).

$$Tw = M \times G \times r \qquad (7b)$$

The acceleration G of the vehicle 10 is given by the following equation (7c), using a differential value of the wheel speed value r×ω.

$$G = r \times d\omega/dt \qquad (7c)$$

Accordingly, the wheel torque estimated value Tw is estimated according to the above-indicated equation (7a).

In the vehicle 10, vibration components to be damped may include a vibration component that occurs in the power source like the engine 20, a vibration component that occurs in the power transmitting device like the transmission 30 or the differential gear 52 located on a transmission path of power of the power source, and so forth, in addition to a vibration component received from the road via the wheels $W_{FR}$, $W_{FL}$, $W_{RR}$, $W_{RL}$. When damping vibrations of the vehicle 10 originating from the above-indicated various vibration components, it is preferable to determine a torque adjustment amount required to damp vibrations with respect to each of the vibration components to be damped, and to incorporate the torque adjustment amount for each vibration component into a basic required driving torque (basic required driving force). The basic required driving torque (basic required driving force) is driving torque (driving force) based on which an output is required of the vehicle drive unit (more particularly, the power source, such as the engine 20), and is set based on the amount of operation of the accelerator pedal 41 by the driver or a target driving torque (target driving force) set in automatic driving control, such as ACC (adaptive cruise control). While the driving torque (driving force) for running the vehicle can be generated by driving the power source with the basic required driving torque (basic required driving force), the above-indicated various vibration components are hardly damped with the basic required driving torque (basic required driving force) alone.

When the torque adjustment amounts for the respective vibration components are incorporated into the basic required driving torque (basic required driving force), all of the torque adjustment amounts may be added together and incorporated into the basic required driving torque (basic required driving force), but are desirably incorporated in the order as described below. More specifically, it is desirable to correct the basic required driving torque (basic required driving force), in view of the frequencies of the vibration components to be damped, so that the torque adjustment amount for a vibration component having a higher frequency is superimposed on (or incorporated into) the basic required driving torque at a later point in time. For example, the frequency of the vibration component that occurs in the above-mentioned power transmitting device is generally higher than that of the vibration component received from the road via the wheels $W_{FR}$, $W_{FL}$, $W_{RR}$, $W_{RL}$, and the frequency of the vibration component that occurs in the power source, such as the engine 20, is generally higher than that of the vibration component that occurs in the above-mentioned power transmitting device. Therefore, it is desirable, from the viewpoint of vibration damping, to incorporate the torque adjustment amount for the vibration component received from the road via the wheels $W_{FR}$, $W_{FL}$, $W_{RR}$, $W_{RL}$, the torque adjustment amount for the vibration component occurring in the power transmitting device, and the torque adjustment amount for the vibration component occurring in the power source, such as engine 20, into the basic required driving torque (basic required driving force) in this order.

When damping the vibration component received from the road via the wheels $W_{FR}$, $W_{FL}$, $W_{RR}$, $W_{RL}$, the torque adjustment amount may be set on the basis of only the vibration component, but is preferably modified or set in view of other conditions. For example, the vehicle speed may be acquired as an operating condition of the vehicle 10, and the torque adjustment amount may be set to be smaller as the vehicle speed increases. Also, an engine temperature, such as a water temperature, may be acquired as a status condition of the power source (engine 10), and the torque adjustment amount may be set to be smaller as the engine temperature increases. Also, the torque adjustment amount may be changed in accordance with the gear position of the transmission 30, or may be reduced when the relationship between the output (driving torque, driving force) of the engine 10 and the rotational speed (engine speed) satisfies a certain condition (for example, under a condition where surge is likely to occur). Also, when the driving torque (driving force) to be transmitted from the power source to the driving wheels $W_{RR}$, $W_{RL}$ becomes substantially equal to 0 or close to 0, it is desirable to reduce or restrict the torque adjustment amount in order to suppress or prevent rattling of the power transmitting device.

The sprung mass damping control is not necessarily to be executed in accordance with occurrence of sprung mass vibrations whenever the sprung mass vibrations occur in the vehicle body, as described above. In other words, there are times at which or conditions under which the execution of the sprung mass damping control should be permitted (which will be called "conditions for permitting sprung, mass damping control"), and there are times at which or conditions under which the execution of the sprung mass damping control should be inhibited (which will be called "conditions for inhibiting sprung mass damping control"). It is thus desirable to determine whether the sprung mass damping control needs to be executed, depending on whether the above conditions are satisfied.

In the first embodiment, the sprung mass damping control system (electronic control unit 1) is provided with a sprung mass damping control execution determining unit, which is configured to allow the sprung mass damping control to be executed under appropriate conditions. The sprung mass damping control execution determining unit makes a determination on which one(s) of the conditions for permitting the sprung mass damping control or the conditions for inhibiting the sprung mass damping control is/are met, according to at least one of operating conditions of the vehicle 10, status conditions of the vehicle 10 and driver's requests, which will be described later, more specifically, according to at least one of various conditions into which the operating conditions of the vehicle 10 are subdivided as described below.

For example, if the sprung mass damping control execution determining unit determines that any of the conditions for inhibiting the sprung mass damping control is met while the sprung mass damping control has not been executed, the sprung mass damping control is not started. On the other hand, if the sprung mass damping control execution determining unit determines that the conditions for permitting the sprung mass damping control are met while the sprung mass damping control has not been executed, the above-mentioned drive controller 2 executes output control of the vehicle drive unit (engine 20 or transmission 30) based on the result of the sprung mass damping control amount set by the sprung mass damping controller (the amount of correction of the driver-requested wheel torque Tw0 determined by the sprung mass damping controller 3), to start the sprung mass damping control. This determination is also made during execution of the sprung mass damping control; therefore, if it is determined again that the conditions for permitting the sprung mass damping control are met, the drive controller continues the sprung mass damping control according to the sprung mass damping control amount set at this time. If the condition(s) for inhibiting the sprung mass damping control is/are met during execution of the sprung mass damping control, the drive controller puts an end to the sprung mass damping control.

When the sprung mass damping control is started and finished, a suitable control pattern for the time that the sprung mass damping control is started (which will be called "sprung mass damping control starting pattern") and a suitable control pattern for the time that the sprung mass damping control is finished (which will be called "sprung mass damping control finishing pattern") are established, respectively. Namely, it may be preferable to immediately start or finish the sprung mass damping control, or may be preferable to gradually start or finish the sprung mass damping control at an appropriate speed, depending on the operating conditions of the vehicle 10, status conditions of the vehicle 10, and driver's requests as will be described later. For example, an abrupt change in torque applied to the driving wheels $W_{RR}$, $W_{RL}$ is generally deemed undesirable, and it is desirable to gradually increase or reduce the wheel torque (wheel driving force) at an appropriate rate. This also applies to sprung mass damping control. In the first embodiment, therefore, the sprung mass damping control starting pattern and the sprung mass damping control finishing pattern are set in a like manner, and the sprung mass damping control is started or finished under appropriate conditions, depending on the operating conditions of the vehicle 10, for example.

The sprung mass damping control starting pattern is set according to at least one of the operating conditions of the vehicle 10, status conditions of the vehicle 10 and driver's requests, more specifically, according to at least one of various conditions into which the operating conditions of the vehicle 10 are subdivided as described below. A sprung mass damping control starting pattern setting unit provided in the sprung mass damping control system (the electronic control unit 1) sets the sprung mass damping control starting pattern. On the other hand, the sprung mass damping control finishing pattern is set according to at least one of the operating conditions of the vehicle 10, status conditions of the vehicle 10 and driver's requests, more specifically, according to at least one of various conditions into which the operating conditions of the vehicle 10 are subdivided as described below. A sprung mass damping control finishing pattern setting unit provided in the sprung mass damping control system (the electronic control unit 1) sets the sprung mass damping control finishing pattern.

In the following, the sprung mass damping control starting pattern setting unit normally sets a sprung mass damping control starting pattern according to which the sprung mass damping control is gradually started (namely, the sprung mass damping control amount is made equal to a set value thereof) over a given period of time (e.g., a fraction of a second), unless otherwise specified. This sprung mass damping control starting pattern will be described more specifically: the output of the vehicle drive unit is initially determined with a control amount (0 or a control amount close to 0) that is smaller than the sprung mass damping control amount set at the time of start of the sprung mass damping control, and then the output of the vehicle drive unit is gradually changed such that the sprung mass damping control amount is gradually increased from the initial value to the set value over a given period of time (in other words, the sprung mass damping control amount is gradually increased to the set value). Meanwhile, a sprung mass damping control starting pattern for immediately starting the sprung mass damping control (namely, for immediately achieving the set value of the sprung mass damping control amount) is such that the output of the vehicle drive unit is controlled so as to achieve the set value of the sprung mass control amount immediately after the start of the sprung mass damping control is determined.

In the following, the sprung mass damping control finishing pattern setting unit normally sets a sprung mass damping control finishing pattern according to which the sprung mass damping control is gradually finished over a given period of time (e.g., a fraction of a second), unless otherwise specified. More specifically, this sprung mass damping control finishing pattern is such that the output of the vehicle drive unit which achieves the set value of the sprung mass damping control amount is initially determined in the same manner as that during the damping control, and then the output of the vehicle drive unit associated with the sprung mass damping control is gradually reduced from this value to 0 (in other words, the sprung mass damping control amount is gradually reduced down to 0). Meanwhile, the sprung mass damping control finishing pattern for immediately finishing the sprung mass damping control is such that the output of the vehicle drive unit associated with the sprung mass damping control is reduced down to 0 immediately after when the completion of the sprung mass damping control is determined.

First, the operating conditions of the vehicle 10 will be explained. The operating conditions of the vehicle 10 mentioned herein include, for example, the vehicle speed, the gear position or shift range position of the transmission 30, a shifting operation of the transmission 30 (which is limited to an automatic transmission having two or more gear positions and a continuously variable transmission), an operating condition of a torque converter of the transmission 30, an operating condition of the throttle valve when the accelerator pedal is operated by the driver or the vehicle operates in an automatic driving mode, such as ACC (adaptive cruse control), rotating conditions of the driving wheels $W_{RR}$, $W_{RL}$, an operating condition of ABS (anti-lock brake system), an operating condition of a vehicle behavior control system, such as VSC (vehicle stability control) or TRC (traction control system), and so forth. Accordingly, the sprung mass damping control execution determining unit may determine which one of the conditions for permitting the sprung mass damping control and the conditions for inhibiting the sprung mass damping control is met, based on at least one of these various operating conditions of the vehicle 10. Also, the sprung mass damping control starting pattern setting unit and the sprung mass damping control finishing pattern setting unit may set the sprung mass damping control starting pattern or the sprung mass damping control finishing pattern, based on at least one of these various operating conditions of the vehicle 10.

Generally, in the vehicle 10, the vehicle speed is estimated based on the wheel speeds of the wheels $W_{FR}$, $W_{FL}$, $W_{RR}$, $W_{RL}$ obtained by the wheel speed acquiring devices (wheel speed sensors) $71_{FR}$, $71_{FL}$, $71_{RR}$, $71_{RL}$, respectively. The accuracy with which the wheel speeds are detected may be reduced depending on a condition between the wheels $W_{FR}$, $W_{FL}$, $W_{RR}$, $W_{RL}$ and the road surface, which may bring about a possibility that the value of the estimated vehicle speed deviates from the actual vehicle speed. This possibility is increased in a low vehicle-speed range. Therefore, the sprung mass damping control system of this embodiment sets a situation where the vehicle speed is higher than a specified vehicle speed (for example, 8 to 10 km/h) as a threshold value, as a condition for permitting the sprung mass damping control, and sets a situation where the vehicle speed is lower than the specified vehicle speed as a condition for inhibiting the sprung mass damping control. For example, in view of variations in the accuracy in estimation of the vehicle speed in a low vehicle-speed range, the sprung mass damping control execution determining unit may be configured to determine that the condition for permitting the sprung mass damping control is met if the vehicle speed is equal to or higher than 10 km/h, and permit execution of the sprung mass damping control, and may also be configured to determine that the condition for inhibiting the sprung mass damping control is met if the vehicle speed is equal to or lower than 8 km/h, and inhibit execution of the sprung mass damping control. If the vehicle speed can be acquired with high accuracy in the low vehicle-speed range, it is not necessary to determine whether the sprung mass damping control is permitted or inhibited, depending on the vehicle speed.

The vehicle 10 as shown in FIG. 1 is equipped with the automatic transmission having two or more gear positions, as the transmission 30. In this case, the transmission 30 is provided with a so-called shift position sensor 31 capable of detecting the current gear position, which enables the electronic control unit 1 to be aware of the current gear position of the transmission 30 when necessary. Where the transmission 30 is a manual transmission, on the other hand, no such shift position sensor is installed, and the current gear position is generally estimated (determined) by comparing the output value of the engine 20 with the output value of the transmission 30. Therefore, when the transmission 30 is in a low-speed gear position, the gear position may be erroneously determined because variations in the output of the engine 20, for example, are larger than those detected when the transmission 30 is in a high-speed gear position. Accordingly, the sprung mass damping control system of the vehicle 10 on which the manual transmission is installed sets a situation where the transmission 30 is in a high-speed gear position equal to or higher than the second-speed gear position where the gear position is less likely to be erroneously determined, as a condition for permitting the sprung mass damping control, and sets a situation where the transmission 30 is in the first-speed gear position where there is a possibility of an erroneous determination on the gear position, as a condition for inhibiting the sprung mass damping control. If the vehicle is equipped with a means for correctly determining the current gear position of the manual transmission, the sprung mass damping control may be executed even when the transmission is in the first-speed gear position.

When the vehicle 10 is not running forward, or when power cannot be transmitted to the driving wheels $W_{RR}$, $W_{RL}$, the above-described control model does not exactly match the actual movements of the vehicle body. Therefore, the sprung mass damping control system sets a situation where the transmission 30 is in a position for running the vehicle 10 forward (i.e., a forward-drive gear position is selected, or the shift lever is placed in the D range) or where the transmission 30 is not in the middle of shifting, as a condition for permitting the sprung mass damping control, and set a situation where the transmission 30 is in a position that does not cause the vehicle 10 to run forward (i.e., a reverse-drive gear position is selected, or the shift lever is placed in the P range, R range, or N range) or where the transmission 30 is in the middle of shifting, as a condition for inhibiting the sprung mass damping control. In the manual transmission, power cannot be transmitted to the driving wheels $W_{RR}$, $W_{RL}$ when a clutch is disengaged. Accordingly, the sprung mass damping control system of the vehicle 10 on which the manual transmission is installed sets a situation where the clutch is disengaged, as a condition for inhibiting the sprung mass damping control. In this connection, when the transmission 30 is brought into a position that does not cause the vehicle 10 to run forward or the transmission 30 is brought into a shifting operation, during execution of the sprung mass damping control, the control model ceases to match the actual movements of the vehicle body, and therefore the sprung mass damping control should be immediately stopped. Also, when the clutch of the manual transmission is disengaged during execution of the sprung mass damping control, power cannot be transmitted to the driving wheels $W_{RR}$, $W_{RL}$, and there is no point in continuing the sprung mass damping control. Therefore, when the transmission 30 is brought into a position that does not cause the vehicle 10 to run forward, or the clutch of the manual transmission is disengaged, during execution of the sprung mass damping control, namely, when it is determined that the above-mentioned condition for inhibiting the sprung mass damping control is met, it is desirable to set the above-described sprung mass damping control finishing pattern in which the sprung mass damping control is immediately finished, in the sprung mass damping control finishing pattern setting unit.

The output of the transmission 30 varies depending on the operating condition of the torque converter even if the input is of the same magnitude. For example, the relationship between the input and output of the transmission 30 can be easily grasped when a lock-up clutch of the torque converter is in a fully engaged state (i.e., during lock-up of the torque converter). However, when the lock-up clutch is in a half-engaged state (its engaging members are in contact with each other while slipping relative to each other) or in a released state (there is no contact between the engaging members), large variations appear in the output of the transmission 30, and the relationship between the input and output of the transmission 30 may not be grasped. If this relationship cannot be correctly grasped, the wheel torque (wheel driving force) acting on the driving wheels $W_{RR}$, $W_{RL}$ may not be controlled to an appropriate or correct magnitude under the sprung mass damping control. Therefore, the sprung mass damping control system sets a situation where the lock-up clutch is in the fully engaged state, as a condition for permitting the sprung mass damping control, and sets a situation where the lock-up clutch is in the half-engaged state or released state, as a condition for inhibiting the sprung mass damping control.

When the lock-up clutch is bought into the half-engaged state or released state during execution of the sprung mass damping control, and it is thus determined that the above condition for inhibiting the sprung mass damping control is met, it is desirable to set the above-described sprung mass damping control finishing pattern in which the sprung mass damping control is immediately finished, in the sprung mass damping control finishing pattern setting unit. This is because, when the lock-up clutch is brought into the half-engaged or released state, the wheel torque (wheel driving force) acting on the driving wheels $W_{RR}$, $W_{RL}$ may not be produced with the correct magnitude under the sprung mass damping control, as described above.

When the accelerator pedal is operated by the driver or the accelerator pedal is under control in the automatic driving mode, the drive controller (engine controller) controls a motor 44 so as to increase the throttle opening of the throttle valve 43. In other words, the drive controller (engine controller) does not control the motor 44 so as to increase the throttle opening of the throttle valve 43 if no operation of the accelerator pedal is detected or the accelerator pedal is not under control in the automatic driving mode. Therefore, when the driver is not operating the accelerator pedal, or the accelerator pedal is not under control in the automatic driving mode, the opening of the throttle valve 43 is smaller than the ISC (idle speed control) opening. When the opening of the throttle valve 43 is smaller than the ISC opening, the output (driving toque, driving force) that decreases with reduction in the throttle opening cannot be produced with an appropriate magnitude even if the sprung mass damping control is performed by controlling the output of the engine 20. Thus, the sprung mass damping control system of this embodiment sets a situation where the throttle valve 43 is controlled to a larger throttle opening (i.e., the accelerator pedal is being operated by the driver, or the accelerator pedal is under control in the automatic driving mode), as a condition for permitting the sprung mass damping control include a condition that. Also, the sprung mass damping control system sets a situation where the throttle valve 43 is not controlled to a larger or smaller throttle opening (i.e., the accelerator pedal is not being operated by the driver, or the accelerator pedal is not under control in the automatic driving mode), as a condition for inhibiting the sprung mass damping control.

When the throttle valve 43 is closed during execution of the sprung mass damping control, and it is thus determined that the above condition for inhibiting the sprung mass damping control is met, it is desirable to set the above-described sprung mass damping control finishing pattern in which the sprung mass damping control is immediately finished, in the sprung mass damping control finishing pattern setting unit. This is because appropriate sprung mass damping control cannot be performed when the operation of the accelerator pedal by the driver is stopped, and the throttle valve 43 is closed.

When the driving wheels $W_{RR}$, $W_{RL}$ are in a slipping condition, the above-described control model does not exactly match the actual movements of the vehicle body, and appropriate wheel torque (wheel driving force) for damping sprung mass vibrations cannot be produced on the driving wheels $W_{RR}$, $W_{RL}$. Therefore, the sprung mass damping control system sets a situation where the driving wheels $W_{RR}$, $W_{RL}$ are not in a slipping condition, as a condition for permitting the sprung mass damping control, and sets a situation where the driving wheels $W_{RR}$, $W_{RL}$ are in a slipping condition, as a condition for inhibiting the sprung mass damping control. It may be determined whether the driving wheels $W_{RR}$, $W_{RL}$ are in a slipping condition, based on the wheel speeds of the respective wheels $W_{FR}$, $W_{FL}$, $W_{RR}$, $W_{RL}$ obtained from the wheel speed acquiring devices (wheel speed sensors) $71_{FR}$, $71_{FL}$, $71_{RR}$, $71_{RL}$. For example, it is determined that the driving wheels $W_{RR}$, $W_{RL}$ are in a slipping condition when a difference between the driven wheels $W_{FR}$, $W_{FL}$ and the driving wheels $W_{RR}$, $W_{RL}$ is equal to or larger than a predetermined value, and it is determined that the driving wheels $W_{RR}$, $W_{RL}$ are not in a slipping condition when the difference in the wheel speed is smaller than the predetermined value. In this example, it may be finally determined that the condition for permitting the sprung mass damping control is met if the determination that the driving wheels are not in a slipping condition continues to be made for a given period of time (e.g., several seconds) or longer, and it may be finally determined that the condition for inhibiting the sprung mass damping control is met if the determination that the driving wheels are in a slipping condition continues to be made for a given period of time (e.g., a function of a second) or longer.

If the driving wheels $W_{RL}$, $W_{RR}$ are brought into a slipping condition during execution of the sprung mass damping control, and it is thus determined that the condition for inhibiting the sprung mass damping control is met, it is desirable to set the above-described sprung mass damping control finishing pattern in which the sprung mass damping control is immediately finished, in the sprung mass damping control finishing pattern setting unit. This is because appropriate sprung mass damping control cannot be performed if the driving wheels $W_{RR}$, $W_{RL}$ are in a slipping condition.

When the ABS, VSC system, TRC system, or the like is in operation, the control executed by any of these systems may interfere with the sprung mass damping control, and one of these controls may have an adverse effect on the other control. Therefore, the sprung mass damping control system sets a situation where the control system, such as ABS, VSC or TRC system, is not in operation, as a condition for permitting the sprung mass damping control, and sets a situation where the control system is in operation, as a condition for inhibiting the sprung mass damping control. When the control system is activated during execution of the sprung mass damping control, and it is thus determined that the condition for inhibiting the sprung mass damping control is met, it is desirable to set the above-described sprung mass damping control finishing pattern in which the sprung mass damping control is immediately finished, in the sprung mass damping control finishing pattern setting unit. This is because the interference between the controls as described above should be avoided at the earliest possible stage.

Next, the status conditions of the vehicle 10 will be described. The status conditions of the vehicle 10 mentioned herein include, for example, a temperature of the motor 44 for driving the throttle valve, conditions of the devices or components related to the sprung mass damping control, condition of the electronic control unit (ECU 1), and so forth. The sprung mass damping control execution determining unit may determine whether any of the conditions for permitting the sprung mass damping control and the conditions for inhibiting the sprung mass damping control is met, based on at least one of the above-indicated status conditions of the vehicle 10. Also, the sprung mass damping control starting pattern setting unit or the sprung mass damping control finishing pattern setting unit may set a sprung mass damping control starting pattern or a sprung mass damping control finishing pattern, based on at least one of the above-indicated status conditions of the vehicle 10.

An actuator (motor 44) for driving the throttle valve get hot or is heated as the throttle valve 43 is operated or driven by the actuator. Thus, the temperature of the motor 44 may increase if the throttle valve 43 is frequently operated by the motor 44 under the sprung mass damping control. If the motor 44 is driven with high-frequency, large-amplitude control current so as to operate the throttle valve 43, for example, to greatly change the opening of the throttle valve 43, heat may accumulate in a bracket portion of a brush of the motor 44, and the response of the motor 44 may deteriorate, resulting in a possibility that favorable sprung mass damping control cannot be performed. Therefore, the sprung mass damping control may be inhibited depending on the temperature of the motor 44. Thus, the sprung mass damping control system sets a situation where the temperature of the motor 44 does not exceed a specified temperature, as a condition for permitting the sprung mass damping control, and sets a situation where the temperature becomes equal to or higher than the specified temperature, as a condition for inhibiting the sprung mass damping control. In this case, the conditions are preferably set only when the above-described feedback control is conducted.

To determine whether the condition for permitting the sprung mass damping control or the condition for inhibiting the sprung mass damping control is met, a temperature sensor for directly detecting the temperature of the motor 44 may be provided, and the determination may be made based on the result of the detection. Where the vehicle drive unit is a gasoline engine, map data having the target opening of the throttle valve 43 and the frequency of the control current of the motor 44 as parameters is prepared in advance, and the sprung mass damping control is executed if the parameters are kept out of a range in the map data where the condition for inhibiting the sprung mass damping control is met, for a given period of time (e.g., several seconds), whereas the sprung mass damping control is inhibited if the parameters are within a range in the map data where the condition for inhibiting the sprung mass damping control is met. The relationship between the map data and the respective parameters is set in advance by experiment, or simulation.

When an abnormality is detected in the devices or components related to the sprung mass damping control, there is a high possibility that appropriate spring mass damping control cannot be conducted. For example, when fail-safe control is executed in the engine 20, the engine 20 cannot provide desired output or power determined under the sprung mass damping control, and appropriate sprung mass damping control cannot be conducted. If there is an abnormality in the wheel speed acquiring devices (wheel speed sensors) $71_{FR}$, $71_{FL}$, $71_{RR}$, $71_{RL}$, errors may appear in the results of computations associated with the sprung mass damping control. The abnormality in the devices or components related to the sprung mass damping control may also occur, for example, in the case where communications by communicating means for brake control are disabled, the case where the gear position or gear ratio of the transmission 30 is erroneously determined, or the case where an abnormality or error occurs in mirror information for use in the sprung mass damping control. The mirror information is prepared so as to determine the integrity of control commands (so-called mirror check) when the sprung mass damping control is conducted, and control signals associated with the control commands are produced as objects to be compared with the control signals. Thus, the sprung mass damping control system sets a situation where none of the abnormalities as illustrated above occurs, as a condition for permitting the sprung mass damping control, and sets a situation where any of the above-indicated abnormalities occurs, as a condition for inhibiting the spring mass damping control.

If any of the abnormalities as illustrated above occurs while the sprung mass damping control is being executed, and it is thus determined that the condition for inhibiting the sprung mass damping control is met, the above-described sprung mass damping control finishing pattern in which the sprung mass damping control is immediately finished is desirably set in the sprung mass damping control finishing pattern setting unit. This is because appropriate sprung mass damping control cannot be performed in the presence of such an abnormality.

Generally, the electronic control unit 1 is characterized in that the control cycle becomes longer as the load increases, and it cannot perform correct computations if significantly large variations occur in the control cycle. The sprung mass damping control is effected by performing various computations as described above, using the control cycle of the electronic control unit 1 as a constant for use in computations of the control model or filtering operations, for example. Therefore, if the electronic control unit 1 does not operate at a normal control cycle (for example, around 8 ms), correct computation results cannot be obtained in the sprung mass damping control, and sprung mass vibrations cannot be appropriately damped. Accordingly, the sprung mass damping control system sets a situation where the electronic control unit 1 is operating at a normal control cycle (for example, the control cycle is kept less than 12 ms for a given period of time (about several seconds)) as a condition for permitting the sprung mass damping control, and sets a situation where the electronic control unit 1 does not operate at a normal control cycle (for example, the control cycle is equal to or longer than 12 ms), as a condition for inhibiting the sprung mass damping control.

If the electronic control unit 1 ceases to operate at a normal control cycle while the sprung mass damping control is being executed, and it is thus determined that the condition for inhibiting the sprung mass damping control is met, the above-described sprung mass damping control finishing pattern in which the sprung mass damping control is immediately finished is desirably set in the sprung mass damping control finishing pattern setting unit. This is because appropriate sprung mass damping control cannot be conducted if the electronic control unit 1 is brought into the above-described condition.

Next, the driver's requests will be explained. The driver's requests mentioned herein refer to, for example, a condition or position of the brake pedal 61 operated by the driver, a driver's request for execution of the sprung mass damping request, and so forth. Thus, the sprung mass damping control execution determining unit may determine whether any of the conditions for permitting the sprung mass damping control and the conditions for inhibiting the sprung mass damping control is met, based on at least one of the various driver's requests. Also, the sprung mass damping control starting pattern setting unit and the sprung mass damping control finishing pattern setting unit may set a sprung mass damping control starting pattern and a sprung mass damping control finishing pattern, based on at least one of the various driver's requests.

The operation of the brake pedal 61 by the driver represents the intention of the driver to reduce the speed of the vehicle 10 or stop the vehicle 10. On the other hand, when the sprung mass damping control is executed, the output of the vehicle drive unit may be controlled so as to apply force to the vehicle 10 in a direction in which the vehicle 10 is accelerated. It is therefore desirable to configure the sprung mass damping control system so that, when the driver operates the brake pedal 61, the sprung mass damping control is not executed taking account of the driver's intention to reduce the vehicle speed, or the like. Accordingly, the sprung mass damping control system of the first embodiment sets a situation where no braking operation by the driver is detected as a condition for permitting the sprung mass damping control, and sets a situation where a braking operation by the driver is detected as a condition for inhibiting the sprung mass damping control. As a result, the driver will not feel uncomfortable about the deceleration of the vehicle that would be smaller than a desired one under the damping control, or an unexpected sense of acceleration. Furthermore, wear of brake pads may be reduced or prevented. The occurrence of the braking operation by the driver may be determined, depending on whether the electronic control unit 1 has received a detection signal of the brake pedal operation amount acquiring unit 67, for example, or whether the electronic control unit 1 has sensed a change in the detection signal.

When it is determined that the condition for inhibiting the sprung mass damping control is met, based on the braking operation by the driver, during execution of the sprung mass damping control, it is desirable to set the above-described sprung mass damping control finishing pattern in which the sprung mass damping control is immediately finished, in the sprung mass damping control finishing pattern setting unit, in order to make the advantageous effect felt by the driver when the sprung mass damping control is inhibited more useful.

Also, the sprung mass damping control includes control for increasing the wheel toque (wheel driving force) of the driving wheels $W_{RR}$, $W_{RL}$ by increasing the output of the vehicle drive unit (for example, increasing the engine output by causing the motor 44 to increase the opening of the throttle valve 43), and control for reducing the wheel torque (wheel driving force) of the driving wheels $W_{RR}$, $W_{RL}$ by reducing the output (for example, reducing the engine output by causing the motor 44 to reduce the opening of the throttle valve 43). When the output of the vehicle drive unit is to be reduced, force is applied to the vehicle 10 in a decelerating direction, which agrees with the driver's intention to reduce the vehicle speed through the braking operation. Therefore, even in the presence of a braking operation by the driver, only the sprung mass damping control for increasing the output of the vehicle drive unit may be inhibited, and the sprung mass damping control for reducing the output of the vehicle drive unit may be permitted.

In the above-described example, the execution of the sprung mass damping control is permitted or inhibited according to the operation of the brake pedal 61 by the driver. If the vehicle 10 is operable under automatic brake control (for example, control for automatically producing braking force in accordance with the distance between the own vehicle and a vehicle in front of the own vehicle) implemented in an automatic driving mode, or the like, the execution of the sprung mass damping control may be permitted or inhibited depending on the presence of braking force applied under the automatic brake control. For example, a situation where an integrated ECU 156 sends a command to a brake ECU 154 so as to operate a brake actuator 93 to produce the braking force is set as a condition for inhibiting the sprung mass damping control, and a situation where the above-indicated command is not sent to the brake ECU 154 is set as a condition for permitting the sprung mass damping control.

Some drivers may not want execution of the sprung mass damping control, or the driver may not want execution of the sprung mass damping control depending on the circumstances. For example, when the vehicle runs on a road from which vibrations that are too large in magnitude to be handled by the sprung mass damping control are received, the driver may deem it unnecessary to execute the sprung mass damping control. Therefore, if desired by the driver, for example, setting on the vehicle side may be changed by using a setting changing device, such as a diagnostics on CAN tool, at an authorized factory, such as a car dealer, so that the sprung mass damping control will not be executed. Also, the vehicle 10 may be equipped with a switch, or the like, for inhibiting execution of the sprung mass damping control, so that the driver can change setting according to his/her preference. The sprung mass damping control system of this example sets a situation where execution of the sprung mass damping control is not set to be inhibited, as a condition for permitting the sprung mass damping control, and sets a situation where execution of the sprung mass damping control is set to be inhibited, as a condition for inhibiting the sprung mass damping control. In this case, the setting of the conditions is preferably carried out only when the above-described feedback control is executed.

As described above, the sprung mass damping control system of the vehicle according to the first embodiment of the invention can appropriately execute or inhibit the sprung mass damping control, under various conditions as described above. Also, the sprung mass damping control system of the vehicle can start the sprung mass damping control according to an appropriate sprung mass damping control starting pattern, and finish the sprung mass damping control that is being executed according to an appropriate sprung mass damping control finishing pattern, under various conditions as described above.

While the sprung mass damping control execution determining unit of the first embodiment determines whether any of the conditions for permitting the sprung mass damping control and the conditions for inhibiting the sprung mass damping control is met, according to at least one of the operating conditions of the vehicle 10, status conditions of the vehicle 10, and driver's requests, as described above, the above determination may be made according to only a combination of arbitrarily selected ones of the operating conditions of the vehicle 10, status conditions of the vehicle 10, and driver's requests. Furthermore, the above determination may be made according to other conditions, in addition to the operating conditions of the vehicle 10, status conditions of the vehicle 10, and driver's requests.

While the sprung mass damping control starting pattern setting unit of the first embodiment sets the sprung mass damping control starting pattern, according to at least one of the operating states of the vehicle 10, status conditions of the vehicle 10 and driver's requests, as described above, the starting pattern may be set according to only a combination of arbitrarily selected ones of the operating conditions of the vehicle 10, status conditions of the vehicle 10 and driver's requests. Furthermore, the sprung mass damping control starting pattern may be set according to other conditions, in addition to the operating conditions of the vehicle 10, status conditions of the vehicle 10, and the driver's requests. Similarly, the sprung mass damping control finishing pattern setting unit may be configured to set the sprung mass damping control finishing pattern, according to only a combination of arbitrary selected ones of the operating conditions of the vehicle 10, status conditions of the vehicle 10 and driver's requests. Also, the sprung mass damping control finishing pattern may be set according to other conditions, in addition to the operating conditions of the vehicle 10, status conditions of the vehicle 10, and the driver's requests.

Next, a sprung mass damping control system of a vehicle according to a second embodiment of the invention will be described with reference to FIG. 6 through FIG. 10. The sprung mass damping control system of the vehicle according to the second embodiment is configured similarly to that of the first embodiment, but executes additional control that will be described below. The vehicle 10 illustrated herein has substantially the same construction as that of the first embodiment.

The vehicle 10 of the second embodiment is equipped with an upper speed limiting control system for running the vehicle while limiting the vehicle speed to a set upper-limit speed, and the electronic control unit 1 that provides the upper speed limiting control system includes an upper speed limiting controller that implements upper speed limiting control. The upper speed limiting control refers to control for reducing the speed of the vehicle 10 by putting a restriction on the final driver-requested torque when the speed of the vehicle 10 exceeds a specified speed that is a little lower than the set upper-limit speed, for example, so that the speed of the vehicle 10 does not exceed the set upper-limit speed. More specifically, the upper speed limiting control refers to control (so-called speed limiter control) for setting the maximum vehicle speed as the set upper-limit speed in advance, and controlling the vehicle 10 so that its speed does not exceed the maximum speed. The upper speed limiting control may also include control (so-called cruise control) under which the upper-limit speed is set to a desired running speed set by the driver, and the vehicle runs at a speed that is equal to or lower than the thus set upper-limit speed. While the speed limiter control is illustrated as a typical example of the upper speed limiting control in this embodiment, it is to be understood that the cruise control may also be executed in a similar manner as an example of the control of the invention as described below.

The upper speed limiting control is executed in the manner as follows: when the speed of the vehicle 10 exceeds the above-mentioned specified speed, the driver-requested torque is multiplied by a given upper speed limiter gain and thereby reduced, to provide a reduced final driver-requested torque, so that the speed of the vehicle 10 does not exceed the set upper-limit speed.

In this connection, strictly speaking, the final driver-requested torque may be determined by exercising smoothing or guard processing using the upper and lower limits, for example, on the driver-requested torque corresponding to the driver's drive request. Therefore, in order to enhance the effectiveness of the sprung mass damping control, it is most desirable to supply the sprung mass damping control amount to an adder (C1a) of the drive controller 2 by addition, after the smoothing, or the like, is performed, namely, at around a later step close to a computation step of determining the final driver-requested torque (for example, immediately before the computation step of determining the final driver-requested torque). Therefore, the operation to multiply the driver-requested torque by the upper speed limiter gain is carried out before the above-mentioned addition is performed. In the second embodiment, the sprung mass damping control system and the upper speed limiting control system are configured in view of the above point.

Figure 6:
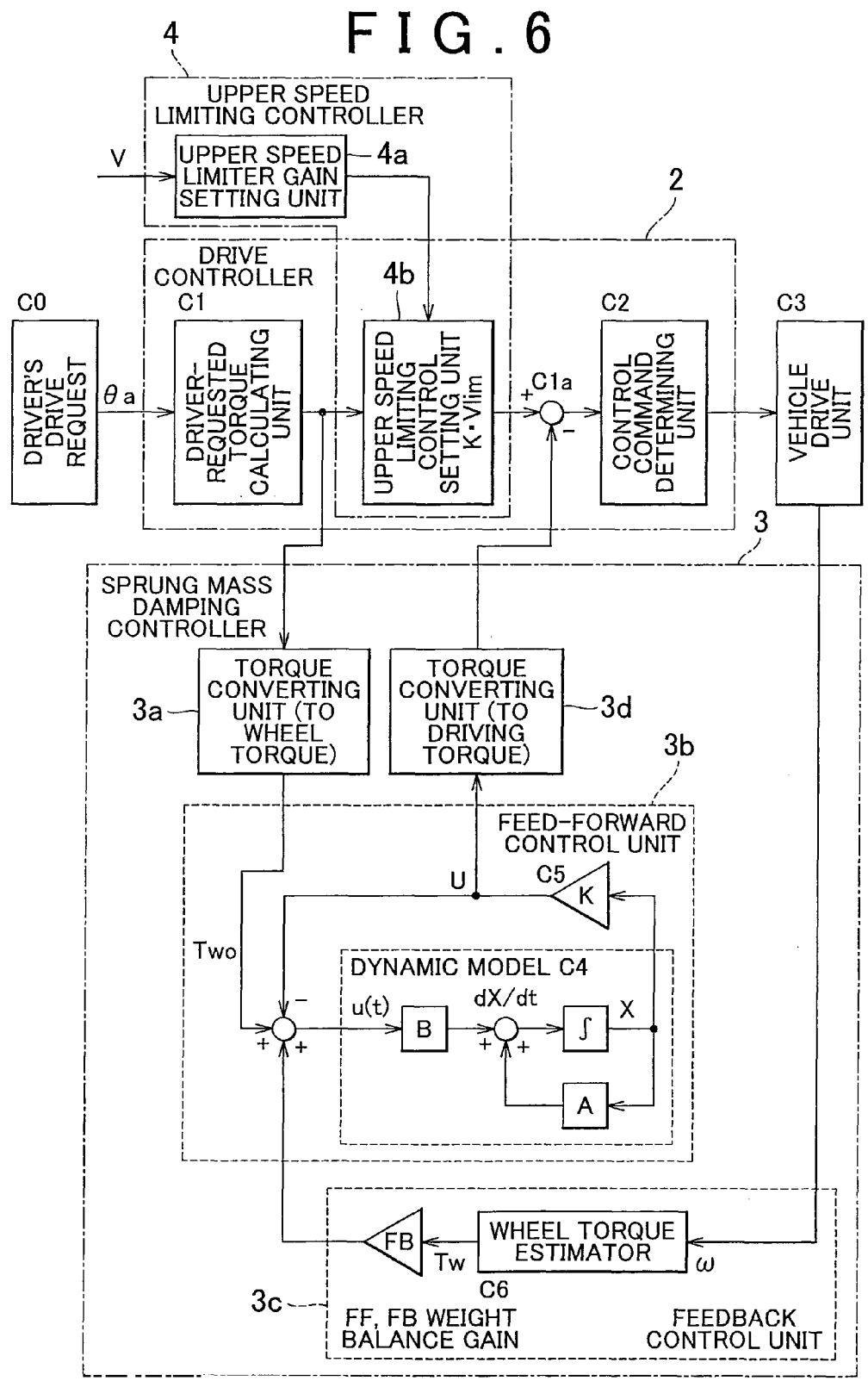
FIG. 6 is a schematic diagram in the form of a control block diagram, showing one example of the configuration of a sprung mass damping control system according to a second embodiment of the invention.

FIG. 6 is a control block diagram schematically showing the configurations of the sprung mass damping control system and the upper speed limiting system according to the second embodiment of the invention. The configurations of the drive controller 2, etc., other than the upper speed limiting controller 4 of the electronic control unit 1, in the control block diagram of FIG. 6 are identical with those of the first embodiment as shown in FIG. 3.

Figure 7:
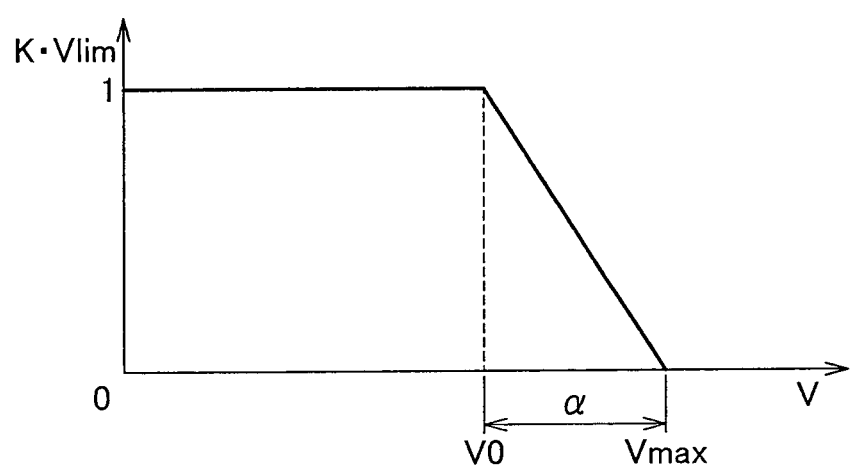
FIG. 7 is a view explaining one example of map data concerning an upper speed limiter gain for use in upper speed limiting control of the second embodiment of the invention.

The upper speed limiting controller 4 consists of an upper speed limiter gain setting unit 4a that sets an upper speed limiter gain K·Vlim in accordance with the vehicle speed V, and an upper speed limiting control setting unit 4b that multiplies the upper speed limiter gain K·Vlim by the driver-requested torque corresponding to the driver's drive request (i.e., the driver-requested torque obtained by the driver-requested torque calculating unit (C1)). The upper speed limiter gain K·Vlim is a factor (driver-requested torque limitation factor for limiting the vehicle speed to the upper limit) for putting a restriction on the magnitude of the final driver-requested torque by reducing the driver-requested torque obtained by the driver-requested torque calculating unit (C1) during execution of the upper speed limiting control, and may be derived from map data as shown in FIG. 7 by way of example. According to the map data, the upper speed limiter gain K·Vlim is set to "1" over a range of vehicle speed from 0 to the above specified speed V0 (=Vmax−α), and the upper speed limiter gain K·Vlim is gradually reduced from the time when the vehicle speed exceeds the specified speed V0 to the time when the vehicle speed becomes equal to the set upper-limit speed Vmax. In this example, the upper speed limiter gain K·Vlim at the set upper-limit speed Vmax is "0". Therefore, if the vehicle speed exceeds the specified speed V0, the final driver-requested torque is gradually reduced, and becomes equal to "0" when the vehicle speed reaches the set upper-limit speed Vmax. In this manner, when the vehicle speed exceeds the specified speed V0, the vehicle 10 is controlled so that the vehicle speed does not exceed the set upper-limit speed Vmax.

In the second embodiment, the driver-requested torque supplied to the torque converting unit 3a of the sprung mass damping controller 3, namely, the driver-requested torque representing the driver's drive request, is supplied to the upper speed limiting control setting unit 4b. Then, at the adder (C1a) of the drive controller 2, the set result of the sprung mass damping control amount that has been converted into drive torque at the torque converting unit 3d is added to the driver-requested torque that has undergone the multiplication for the upper speed limiting control at the upper speed limiting control setting unit 4b.

The sprung mass damping control system and the upper speed limiting control system execute the sprung mass damping control and the upper speed limiting control at the same time when the speed of the vehicle 10 exceeds the specified speed V0. At this time, the driver-requested torque obtained in the driver-requested torque calculating unit (C1) is multiplied by the upper speed limiter gain K·Vlim (<1) to be reduced in the upper speed limiting controller 4. As a result, the output of the engine 20 is reduced in the vehicle 10, and the vehicle is decelerated so that the vehicle speed V is limited to the set upper-limit speed Vmax. However, when the set result of the sprung mass damping control amount is a positive value, the set result of the sprung mass damping control amount is added to the driver-requested torque that has been reduced according to the upper speed limiter gain K·Vlim at the adder (C1a); therefore, the final driver-requested torque obtained through the addition becomes larger than the driver-requested torque that has been reduced under the upper speed limiting control, and the speed of the vehicle 10 may not be limited to an appropriate upper-speed speed set under the upper speed limiting control.

In the sprung mass damping control system of the second embodiment, therefore, the sprung mass damping control is inhibited during execution of the upper speed limiting control.

Figure 8:
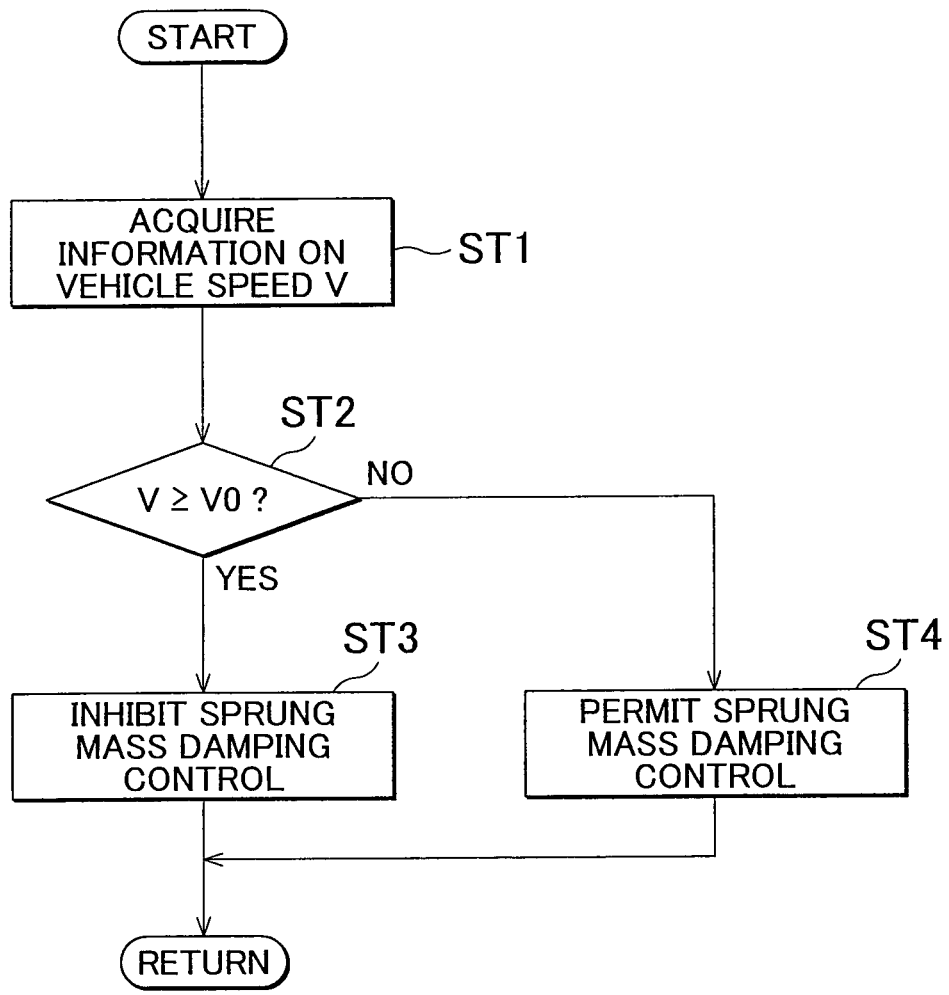
FIG. 8 is a flowchart explaining a control operation of the sprung mass damping control system shown in FIG. 6.

As shown in the flowchart of FIG. 8, for example, the sprung mass damping controller acquires information on the vehicle speed V (step ST1), and compares the vehicle speed V with the above-mentioned specified speed V0 (step ST2). In step ST1, the sprung mass damping controller may acquire information of the vehicle speed V estimated from the wheel speeds of the respective wheels $W_{FR}$, $W_{FL}$, $W_{RR}$, $W_{RL}$, as described above, or may acquire information on the vehicle speed V detected by a vehicle speed detector, such as a vehicle speed sensor (not shown).

When the sprung mass damping controller determines in step ST2 that the vehicle speed V is equal to or higher than the specified speed V0, it inhibits execution of the sprung mass damping control (step ST3) since the upper speed limiting control is executed by the upper speed limiting controller 4. For example, in step S3, a sprung mass damping control inhibition flag is set, so that the adder (C1a) is inhibited from receiving the set result of the sprung mass damping control amount, and the driver-requested torque that has been processed (multiplied by the gain) in the upper speed limiting control setting unit 4b is transmitted to the control command determining unit (C2) without being subjected to the addition at the adder (C1a). As a result, the control command determining unit (C2) receives the driver-requested torque that has been reduced under upper speed limiting control in the upper speed limiting control setting unit 4b, as the final driver-requested torque.

In this case, the upper speed limiting controller sets the upper speed limiter gain K·Vlim to a value that is smaller than "1" and is commensurate with the vehicle speed V, in the upper speed limiter gain setting unit 4a, and multiplies the driver-requested torque obtained in the driver-requested torque calculating unit (C1) by the upper speed limiter gain K·Vlim (<1) in the upper speed limiting control setting unit 4b. Then, the upper speed limiting controller sends the result of the multiplication to the drive controller 2. The result of the multiplication is fed to the control command determining unit (C2) without being subjected to the addition at the adder (C1a). Thus, the drive controller regards the driver-requested torque that has been reduced by the upper speed limiting control setting unit 4b under the upper speed limiting control, as the final driver-requested torque, and controls the vehicle drive unit so as to produce the final driver-requested torque. Since the control amount of the upper speed limiting control is not changed, the vehicle 10 executes the upper speed limiting control when the vehicle speed V needs to be limited, so as to control the vehicle speed V to an appropriate speed that is limited to the set upper-limit speed Vmax. If the above-described processing, such as smoothing, is carried out in a step following the upper speed limiting control setting unit 4b, the driver-requested torque that has been reduced in the upper speed limiting control setting unit 4b and then subjected to the smoothing, or the like, is fed to the adder (C1a).

On the other hand, if it is determined in step ST2 that the vehicle speed V is lower than the specified speed V0, the upper speed limiting control is not executed; therefore, it is determined that the sprung mass damping control can be executed without being affected by the upper speed limiting control, and the execution of the sprung mass damping control is permitted (step ST4). For example, in step ST4, a sprung mass damping control permission flag is set, and the addition is performed at the adder (C1a).

In this case, the upper speed limiting controller sets the upper speed limiter gain K·Vlim to "1" in the upper speed limiter gain setting unit 4a, and multiplies the driver-requested torque obtained in the driver-requested torque calculating unit (C1) by the upper speed limiter gain K·Vlim(=1) in the upper speed limiting control setting unit 4b. Then, the upper speed limiting controller supplies the result of the multiplication (=the driver-requested torque obtained in the driver-requested torque calculating unit (C1) to the drive controller. The result of the multiplication is fed to the adder (C1a) where the set result of the sprung mass damping control amount of the torque converting unit 3d is added to the result of the multiplication, and is then fed to the control command determining unit (C2). Therefore, when it is necessary to execute sprung mass damping control in the vehicle 10, the sprung mass damping control is executed with the sprung mass damping control amount corresponding to the need for the damping control, in the same manner as that indicated in the first embodiment. In this case, the operation to multiply the driver-requested torque by the upper speed limiter gain K·Vlim in the upper speed limiting control setting unit 4b may not be performed. Also, if the above-described processing, such as smoothing, is carried out in a step following the upper speed limiting control setting unit 4b, the torque obtained by practicing the processing (e.g., smoothing) on the driver-requested torque received from the driver-requested torque calculating unit (C1) is fed to the adder (C1a).

The control routine of FIG. 8 as illustrated above is repeatedly executed during running of the vehicle 10. Accordingly, when the vehicle speed V becomes lower than the specified speed V0 after execution of the upper speed limiting control, the control proceeds to step ST4 so that the sprung mass damping control that has been inhibited is permitted.

The sprung mass damping control system of the second embodiment inhibits execution of the sprung mass damping control when the vehicle speed V needs to be limited, so that the upper speed limiting control for controlling the vehicle speed to an appropriate speed can be executed. On the other hand, sprung mass vibrations that occur in the vehicle body cannot be damped or suppressed in the vehicle 10 at this time. If the sprung mass vibrations are too small to be noticed or felt by the driver, for example, and are not so large as to bring about changes in the behavior of the vehicle 10, for example, a higher priority should be given to execution of appropriate upper speed limiting control for controlling the vehicle speed V not to exceed the set upper-limit speed Vmax. On the other hand, if the sprung mass vibrations are so large that they can be noticed or felt by the driver, for example, and are so large as to bring about changes in the behavior of the vehicle 10, for example, it is preferable to damp the sprung mass vibrations with the sprung mass damping control, while at the same time limiting the vehicle speed V with the upper speed limiting control.

In the sprung mass damping control system of the second embodiment, therefore, the sprung mass damping control is not immediately inhibited in response to a determination that the vehicle speed V becomes equal to or higher than the specified speed V0. Rather, when the vehicle speed V becomes equal to or higher than the specified speed V0, the sprung mass damping control amount (more specifically, the set result of the sprung mass damping control amount) may be adjusted in accordance with the vehicle speed V, and the upper speed limiting control may be started while the sprung mass damping control is executed.

For example, since it takes more time for the vehicle speed V to reach the set upper-limit speed Vmax as the vehicle speed V is lower, the sprung mass damping controller 3 is configured to exercise guard processing using the upper and lower limits or rate processing on the set result of the sprung mass damping control amount, according to the vehicle speed V, so as to reduce the set result of the sprung mass damping control amount. The guard processing with the upper and lower limits, or the like, is performed on the amount of correction of the driver-requested wheel torque Tw0 fed to the torque converting unit 3d, or the set result of the sprung mass damping control amount obtained in the torque converting unit 3d.

The guard processing with the upper and lower limits is to put a restriction on a positive value of the correction amount of the driver-requested wheel torque Tw0 or the set result of the sprung mass damping control amount with an upper guard value, and put a restriction on a negative value of the correction amount of the driver-requested wheel torque Tw0 or the set result of the sprung mass damping control amount with a lower guard value, thereby to reduce the sprung mass damping control amount. With the guard processing using the upper and lower limits thus performed, the adder (C1a) receives the set result of the spring mass damping control amount that is reduced as compared with the time when the upper- and lower-limit guard processing is not performed.

The upper guard value, which is a positive value, is set to a larger value in the positive direction as the vehicle speed V is lower. On the other hand, the lower guard value, which is a negative value, is set to a larger value in the negative direction as the vehicle speed V is lower. Therefore, when the vehicle speed V becomes equal to or higher than the specified speed V0, the amount of reduction of the sprung mass damping control amount decreases as the vehicle speed V is lower, and the sprung mass damping control, which would have been conducted if the upper speed limiting control were not executed, is executed using a sprung mass damping control amount that is close to the control amount before subjected to the guard processing. In this case, the control amount of the upper speed limiting control increases with the sprung mass damping control amount. However, if the vehicle speed V is relatively low, the upper guard value is set to an appropriate value by experiment, or the like, so that favorable upper speed limiting control can be conducted, whereby the vehicle speed V can be controlled not to exceed the set upper-limit speed Vmax. The upper guard value is set so that the optimum upper speed limiting control can be executed along with the sprung mass damping control over the entire range from the specified speed V0 to the set upper-limit speed Vmax. Here, the upper guard value and the lower guard value may be set to "0" at the set upper-limit speed Vmax, for example. In this case, the sprung mass damping control ceases to be executed when the vehicle speed V becomes equal to the set upper-limit speed Vmax, and appropriate upper speed limiting control can be performed with the upper-limit speed Vmax set as the upper limit.

The rate processing is effected when the vehicle speed V becomes equal to or higher than the specified speed V0 so as to restrict an amount (or rate) of change of the correction amount of the driver-requested wheel torque Tw0 fed to the torque converting unit 3d or an amount (or rate) of change of the set result of the sprung mass damping control amount obtained in the torque converting unit 3d. Through the rate processing, the adder (C1a) receives the set result of the sprung mass damping control amount that is reduced as compared with that of the case where the rate processing is not executed.

A limit value of the amount of change of the sprung mass damping control amount used in the rate processing is obtained by experiment, or the like, as a value with which a desired restriction can be put on the amount of change. The limit value may be a predetermined value, or may vary with the vehicle speed V. In the latter case where the limit value varies with the vehicle speed V, the limit value may be set to a larger value as the vehicle speed is higher.

In order to perform favorable sprung mass damping control and upper speed limiting control at the same time after the vehicle speed V becomes equal to or higher than the specified speed V0, the following control scheme may be employed.

For example, the sprung mass damping control amount CV is subjected an upper speed limiting process so as to be reduced or corrected, and the sprung mass damping control is carried out using the thus corrected sprung mass damping control amount CV. The corrected value of the spring mass damping control amount CV is obtained by correcting (and reducing) the sprung mass control amount CV obtained by the sprung mass damping controller 3 with a limitation factor for limiting the sprung mass damping control amount in order to limit the vehicle speed to the upper limit. Accordingly, the sprung mass damping control is restricted by reducing the control amount with the sprung mass damping control amount limiting factor provided for limiting the vehicle speed to the upper limit.

The sprung mass damping control amount limitation factor provided for limiting the vehicle speed to the upper limit is a factor that puts a restriction on the sprung mass damping control by reducing the sprung mass damping control amount CV obtained by the sprung mass damping controller during execution of the upper speed limiting control. For example, the control amount limitation factor is set as a sprung mass damping control amount limiter gain K·Vlim1 provided for limiting the vehicle speed to the upper limit. Like the upper speed limiter gain K·Vlim as described above, the sprung mass damping control amount limiter gain K·Vlim1 for limiting the vehicle speed to the upper limit takes different values (i.e., varies) depending on the vehicle speed V, and is thus set in the form of map data. More specifically, the sprung mass damping control amount limiter gain K·Vlim1 is set to "1" when the vehicle speed V is equal to or lower that the above-indicated specified value V0 (=Vmax−α), and gradually decreases from "1" after the vehicle speed V exceeds the specified value V0, until the vehicle speed V becomes equal to the set upper-limit speed Vmax. In the vehicle 10, therefore, once the vehicle speed exceeds the specified speed V0, the sprung mass damping control is restricted to the extent that increases as the vehicle speed V increases. The sprung mass damping control amount limiter gain K·Vlim1 at the set upper-limit speed Vmax is not necessarily set to "0". Accordingly, the vehicle 10 may be under spring mass damping control when the vehicle speed becomes equal to the set upper-limit speed Vmax. In this example, the upper speed limiter gain K·Vlim is used as the sprung mass damping control amount limiter gain K·Vlim1. However, if the sprung mass damping control and the upper speed limiting control can be carried out in respective favorable manners, the rate of decrease (or slope) of the sprung mass damping control amount limiter gain K·Vlim1 from the specified speed V0 to the set upper-limit speed Vmax may be different from that of the upper speed limiter gain K·Vlim.

Figure 9:
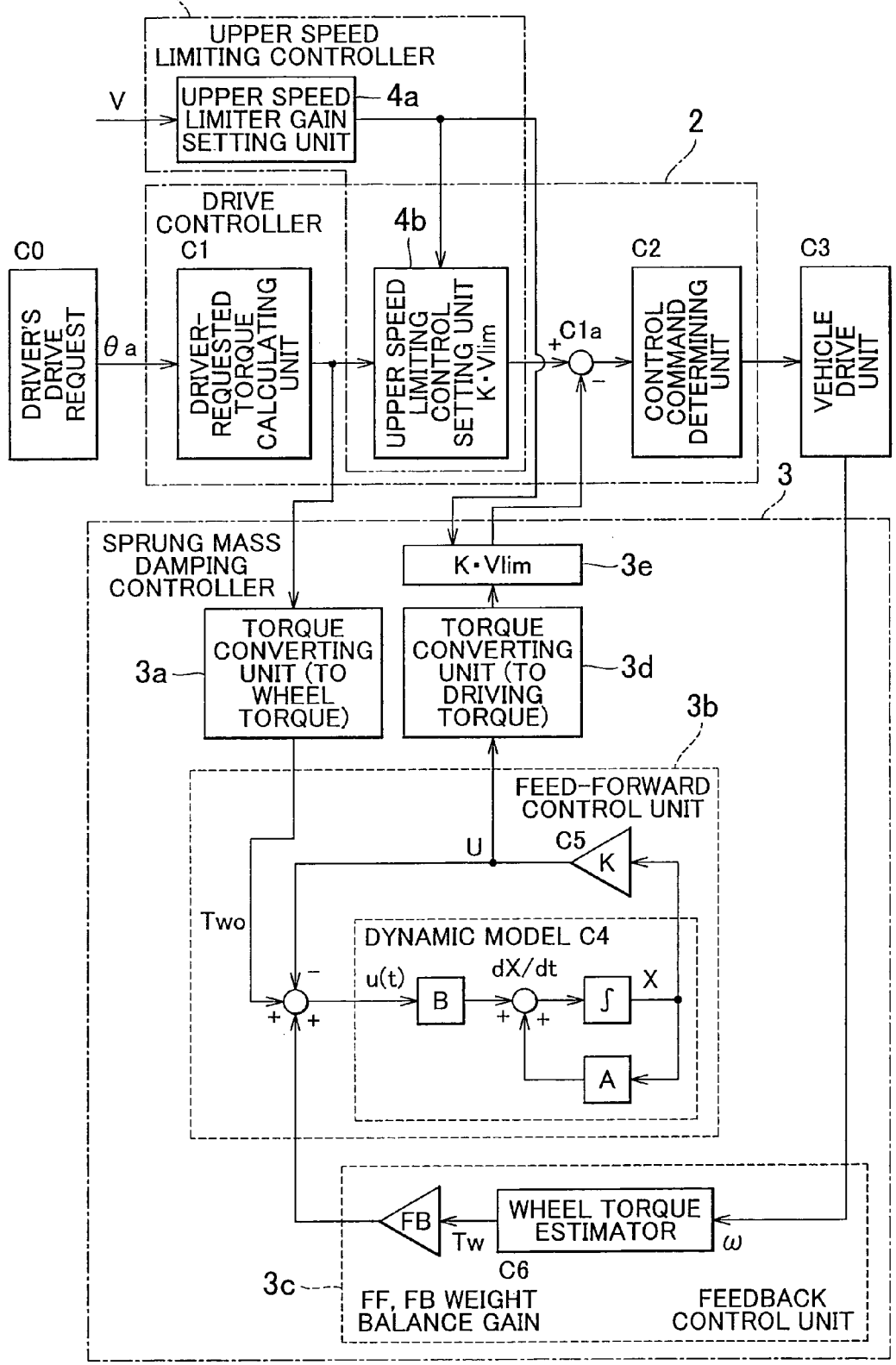
FIG. 9 is a schematic diagram in the form of a control block diagram, showing another example of the configuration of a sprung mass damping control system according to the second embodiment of the invention.

FIG. 9 is a control block diagram schematically representing the configuration of the sprung mass damping control system and upper speed limiting control system of the above case. The configuration as shown in the control block diagram of FIG. 9 is obtained by adding an arrangement associated with correction of the sprung mass damping control amount CV to that shown in the control block diagram of FIG. 6 as described above.

As the arrangement associated with the correction, a sprung mass damping control amount correcting unit 3e is prepared which multiplies the sprung mass damping control amount limiter gain K·Vlim1 by the sprung mass damping control amount CV (i.e., the amount of correction of the driver-requested wheel torque Tw0 fed to the torque converting unit 3d or the set result of the sprung mass damping control amount at the torque converting unit 3d). In the control block diagram of FIG. 9, the sprung mass damping control amount correcting unit 3e is located downstream of the torque converting unit 3d, and functions to multiply the set result of the sprung mass damping control amount at the torque converting unit 3d by the sprung mass damping control amount limiter gain K-Vlim1 (=upper speed limiter gain K·Vlim).

Figure 10:
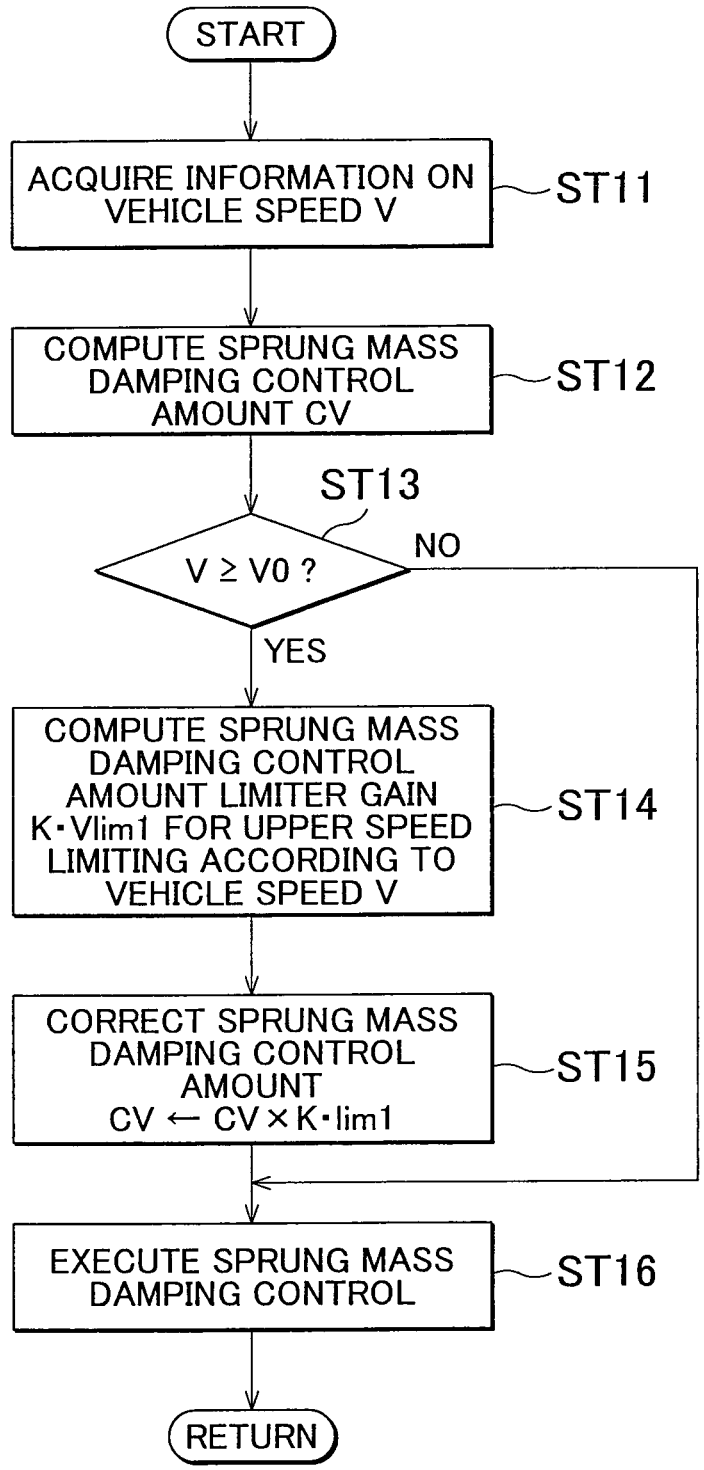
FIG. 10 is a flowchart explaining a control operation of the sprung mass damping control system shown in FIG. 9.

The sprung mass damping control as described above will be further explained with reference to the flowchart of FIG. 10. Initially, the sprung mass damping controller acquires information on the vehicle speed V (step ST11), as in the case illustrated above with reference to FIG. 8.

Also, the sprung mass damping controller obtains the sprung mass damping control amount CV (step ST12). In this example, the computation result of the torque converting unit 3d, namely, the set result of the sprung mass damping control amount, is obtained in the same manner as in the first embodiment.

Subsequently, the sprung mass damping controller compares the vehicle speed V with the above-mentioned specified value V0 (step ST13).

If the sprung mass damping controller determines in step ST13 that the vehicle speed V is equal to or higher than the specified speed V0, the upper speed limiting control is executed; therefore, the sprung mass damping control amount obtained in step ST12 (i.e., the set result of the sprung mass damping control) is reduced/corrected according to the vehicle speed V, so as to restrict the spring mass damping control.

More specifically, the sprung mass damping controller obtains a sprung mass damping control amount limiter gain K·Vlim1 provided for limiting the vehicle speed to the upper limit, according to the vehicle speed V (step ST14). In this example, the upper speed limiter gain K·Vlim is used as the sprung mass damping control amount limiter gain K·Vlim1. Accordingly, the sprung mass damping controller receives the upper speed limiter gain K·Vlim set in accordance with the vehicle V in the upper speed limiter gain setting unit 4a, and uses the gain K·Vlim as the sprung mass damping control amount limiter gain K·Vlim1.

Next, the sprung mass damping control amount correcting unit 3e of the sprung mass damping controller multiplies the sprung mass damping control amount CV (the set result of the sprung mass damping control amount) of step ST12 by the sprung mass damping control amount limiter gain K·Vlim1 (=the upper speed limiter gain K·Vlim), so as to reduce/correct the sprung mass damping control amount CV (step ST15). After execution of step ST15, the sprung mass damping control amount CV that has been corrected is set as the sprung mass damping control amount CV for use in the sprung mass damping control.

If the sprung mass damping controller determines that the vehicle speed V is lower than the specified speed V0, on the other hand, the upper speed limiting control is not executed, and it is determined that the sprung mass damping control is executed without being affected by the upper speed limiting control. Therefore, the sprung mass damping control amount CV obtained in step ST12 (the set result of the sprung mass damping control amount) is set as the sprung mass damping control amount CV for use in the sprung mass damping control.

In the vehicle 10, the sprung mass damping control is executed using the thus set sprung mass damping control amount CV (step ST16). In step ST16, the set sprung mass damping control amount CV is fed to the adder (C1a), where the set sprung mass damping control amount CV and the driver-requested torque that has been multiplied by the upper speed limiter gain K·Vlim in the upper speed limiting control setting unit 4b are added together. Then, in step ST16, the result of the addition is fed to the control command determining unit (C2) to provide a control command, and the output of the engine 20 is controlled based on the control command.

For example, when the vehicle speed V is lower than the specified speed V0, the upper speed limiting control is not executed, and normal-time sprung mass damping control is executed based on the sprung mass damping control amount CV (the set result of the sprung mass damping control amount) obtained in step ST12. Therefore, in the vehicle 10, sprung mass vibrations that occur in the vehicle body are appropriately damped. The "normal-time" mentioned above refers to the time when the sprung mass damping control amount CV is not reduced/corrected in the sprung mass damping control amount correcting unit 3e.

When the vehicle speed V is equal to or higher than the specified speed V0, on the other hand, the sprung mass damping control is executed using a control amount that is reduced to be smaller than that of the normal-time damping control, namely, based on the sprung mass damping control amount CV that has been corrected in step ST15, and the upper speed limiting control is also executed at the same time. At this time, since the corrected sprung mass damping control amount CV is added, the control amount of the upper speed limiting control becomes larger than that of the normal-time control at the same vehicle speed, and the deceleration of the vehicle after the vehicle speed V exceeds the specified speed V0 becomes smaller than that of the normal-time control. However, at this time, the sprung mass damping control is not completely inhibited, namely, the sprung mass damping control is executed with the sprung mass damping control amount CV that is reduced to be smaller than that of the normal-time control for achievement of favorable upper speed limiting control; therefore, the effect of limiting the speed V under the upper speed limiting control and the useful effect provided by damping the sprung mass vibrations can be both obtained.

The vibration damping control for the vehicle 10 is not limited to the sprung mass damping control for damping sprung mass vibrations as described above, but may include various controls. In the vehicle 10 of the first and second embodiments as described above, when two or more vibration damping controls including the sprung mass damping control are executed at the same time, only the sprung mass damping control is stopped if any of the conditions for inhibiting sprung mass damping control as described above is met.

While the vehicle 10 of the first and second embodiments employs the engine 20 as its power source (vehicle drive unit), the vehicle drive unit associated with the sprung mass damping control may be a combination of the engine and a motor if the vehicle is a hybrid vehicle, or may be a motor if the vehicle is an electric vehicle.

In the vehicle 10, the wheel braking torque (wheel braking force) applied to the driving wheels $W_{RR}$, $W_{RL}$ by the brake system may be referred to in another way as force for reducing the magnitude of the wheel torque (wheel driving torque) exerted on the driving wheels $W_{RR}$, $W_{RL}$. Accordingly, the brake system may function as a vehicle drive unit, like the engine 20 or the transmission 30, and may be utilized in the sprung mass damping control. In this case, the sprung mass vibrations are damped by reducing the wheel torque (wheel driving force) of the driving wheels $W_{RR}$, $W_{RL}$.

As described above, the sprung mass damping control system of the vehicle according to the invention is useful when sprung mass damping control is performed so as to damp sprung mass vibrations.

The invention claimed is:

1. A sprung mass damping control system of a vehicle, comprising:

a sprung mass damping controller configured to set a sprung mass damping control amount for damping sprung mass vibrations that occur in a vehicle body in response to an input from a road or a driver-requested torque, the sprung mass damping controller including a first torque converting unit that coverts driver-requested torque into driver-requested wheel torque, a feed-forward control unit, a feedback control unit, and a second torque converting unit that converts an amount of correction of the driver-requested wheel torque into a unit of driving torque, and a drive controller configured to control torque of an engine or of a transmission of the vehicle based on the unit of driving torque to achieve the sprung mass damping control amount, thereby to execute sprung mass damping control, wherein the drive controller is configured to inhibit execution of the sprung mass damping control according to at least one condition of the vehicle which includes a temperature of a motor that drives a throttle valve of the vehicle being greater than a predetermined temperature.

2. The sprung mass damping control system according to claim 1, wherein the at least one condition of the vehicle includes a vehicle speed, a gear position of a transmission installed on the vehicle, an operating condition of a throttle valve, and rotating conditions of driving wheels.

3. The sprung mass damping control system according to claim 1, wherein the at least one condition of the vehicle includes conditions of devices or components related to the sprung mass damping control and a condition of an electronic control unit provided for implementing the sprung mass damping control.

4. The sprung mass damping control system according to claim 1, wherein the at least one condition of the vehicle includes a condition of a brake pedal operated by the driver and a driver's request for execution of the sprung mass damping control.

5. The sprung mass damping control system according to claim 1, further comprising:
a sprung mass damping control starting pattern setting unit that sets a control pattern at the time of start of the spring mass damping control to one of a sprung mass damping control starting pattern for immediately achieving the sprung mass damping control amount, and a sprung mass damping control starting pattern for gradually approaching the sprung mass damping control amount, according to at the least one condition of the vehicle, when execution of the sprung mass damping control is permitted while the sprung mass damping control is not executed, wherein
the drive controller is configured to control the torque of the engine or of the transmission of the vehicle, based on a set result of the sprung mass damping control starting pattern setting unit.

6. The sprung mass damping control system according claim 1, further comprising:
a sprung mass damping control finishing pattern setting unit that sets a control pattern at the time of completion of the spring mass damping control to one of a sprung mass damping control finishing pattern for immediately finishing the sprung mass damping control, and a sprung mass damping control finishing pattern for gradually finishing the sprung mass damping control, according to the at least one condition of the vehicle, when execution of the sprung mass damping control is inhibited while the sprung mass damping control is being executed, wherein
the drive controller is configured to control the torque of the engine or of the transmission of the vehicle, based on a set result of the sprung mass damping control finishing pattern setting unit.

7. A sprung mass damping control system of a vehicle, comprising:
a sprung mass damping controller configured to set a sprung mass damping control amount for damping sprung mass vibrations that occur in a vehicle body in response to an input from a road or a driver-requested torque, the sprung mass damping controller including a first torque converting unit that coverts driver-requested torque into driver-requested wheel torque, a feed-forward control unit, a feedback control unit, and a second torque converting unit that converts an amount of correction of the driver-requested wheel torque into a unit of driving torque, and
a drive controller that controls torque of an engine or of a transmission of the vehicle based on the unit of driving torque so as to achieve the sprung mass damping control amount,
wherein the drive controller is configured to finish the sprung mass damping control according to at least one condition of the vehicle which includes a temperature of a motor that drives a throttle valve of the vehicle being greater than a predetermined temperature.

8. The sprung mass damping control system according to claim 7, wherein the at least one condition of the vehicle includes a vehicle speed, a gear position of a transmission installed on the vehicle, an operating condition of a throttle valve, and rotating conditions of driving wheels.

9. The sprung mass damping control system according to claim 7, wherein the at least one condition of the vehicle includes conditions of devices or components related to the sprung mass damping control, and a condition of an electronic control unit provided for implementing the sprung mass damping control.

10. The sprung mass damping control system according to claim 7, wherein the at least one condition of the vehicle includes a condition of a brake pedal operated by the driver and a driver's request for execution of the sprung mass damping control.

11. The sprung mass damping control system according to claim 7, wherein the sprung mass damping controller inhibits execution of the sprung mass damping control when upper speed limiting control for limiting a speed of the vehicle to a set upper-limit speed is executed.

12. The sprung mass damping control system according to claim 11, wherein the sprung mass damping controller inhibits execution of the sprung mass damping control when the speed of the vehicle is equal to or higher than a specified speed.

13. The sprung mass damping control system according to claim 7, wherein the sprung mass damping controller is configured to reduce the sprung mass damping control amount when upper speed limiting control for limiting a speed of the vehicle to a set upper-limit speed is executed.

14. The sprung mass damping control system according to claim 13, wherein the sprung mass damping controller reduces the sprung mass damping control amount as the vehicle speed increases, when the speed of the vehicle is equal to or higher than a specified speed.

15. The sprung mass damping control system according to claim 7, wherein the sprung mass vibrations include at least one of vibrations applied in a direction of bouncing of the vehicle and vibrations applied in a direction of pitching of the vehicle.

16. The sprung mass damping control system according to claim 1, wherein the sprung mass damping controller inhibits execution of the sprung mass damping control when upper speed limiting control for limiting a speed of the vehicle to a set upper-limit speed is executed.

17. The sprung mass damping control system according to claim 16, wherein the sprung mass damping controller inhibits execution of the sprung mass damping control when the speed of the vehicle is equal to or higher than a specified speed.

18. The sprung mass damping control system according to claim 1, wherein the sprung mass damping controller is configured to reduce the sprung mass damping control amount when upper speed limiting control for limiting a speed of the vehicle to a set upper-limit speed is executed.

19. The sprung mass damping control system according to claim 18, wherein the sprung mass damping controller reduces the sprung mass damping control amount as the vehicle speed increases, when the speed of the vehicle is equal to or higher than a specified speed.

20. The sprung mass damping control system according to claim 1, wherein the sprung mass vibrations include at least one of vibrations applied in a direction of bouncing of the vehicle and vibrations applied in a direction of pitching of the vehicle.

* * * * *